US012275072B2

(12) United States Patent
Swift et al.

(10) Patent No.: US 12,275,072 B2
(45) Date of Patent: Apr. 15, 2025

(54) ROTARY CUTTER FOR MACHINING MATERIALS

(71) Applicant: NEW TECH CUTTING TOOLS, INC., Kent, WA (US)

(72) Inventors: Steven M. Swift, Kent, WA (US); Luke Tyler Swift, Kent, WA (US)

(73) Assignee: NEW TECH CUTTING TOOLS, INC., Kent, WA (US)

( * ) Notice: Subject to any disclaimer, the term of this patent is extended or adjusted under 35 U.S.C. 154(b) by 0 days.

(21) Appl. No.: 17/580,455

(22) Filed: Jan. 20, 2022

(65) Prior Publication Data
US 2022/0161336 A1 May 26, 2022

Related U.S. Application Data

(63) Continuation of application No. 16/444,948, filed on Jun. 18, 2019, now abandoned, which is a
(Continued)

(51) Int. Cl.
B23C 5/28 (2006.01)
B23C 5/10 (2006.01)

(52) U.S. Cl.
CPC .............. B23C 5/10 (2013.01); B23C 5/28 (2013.01); B23C 2210/40 (2013.01); B23C 2210/44 (2013.01); B23C 2250/12 (2013.01)

(58) Field of Classification Search
CPC .. B23C 5/10; B23C 5/28; B23C 5/287; B23C 2210/04; B23C 2210/0492;
(Continued)

(56) References Cited

U.S. PATENT DOCUMENTS 2,129,417 A 9/1938 Gase
3,037,264 A 6/1962 Mossberg
(Continued)

FOREIGN PATENT DOCUMENTS

CA 2392965 A1 * 1/2003 ............. B23B 51/00
JP 2000052127 A * 2/2000 ............... B23C 5/10
(Continued)

OTHER PUBLICATIONS

JP 2006 110683 A—Machine translation, (10 pgs) see pp. 5-10 (year: 2021) + EPO—Patent Translate—English translation of claims and description (19 pgs).
(Continued)

Primary Examiner — Nicole N Ramos
(74) Attorney, Agent, or Firm — R. Reams Goodloe, Jr.

(57) ABSTRACT

Novel endmills are provided. Such endmills have a body with outside diameter (OD), and outer surface, and a longitudinal axis, a plurality of flutes, helical in some embodiments. Flutes include a narrow leading edge land portion with circular segment profile and having flute cutting edge portions along a substantially uniform circumferential location, with an eccentric relief margin rotationally rearward of the narrow leading edge land portions. Face portions are provided with face cutting edge portions, and with a first dish portion adjacent each of the cutting edge portions sloping inwardly and downwardly generally toward a central longitudinal axis at a first dish angle alpha ($\alpha$). Corner blend portions extend from flute cutting edge portions to the face cutting edge portions. Corner blend portions are provided in a variety of profiles, including an embodiment wherein the profile of the corner blend portions are truncated before the segment of curvature becomes tangential to the face cutting edge portions. In various embodiments, one or more coolant passageways are provided, and in an embodiment, an exit
(Continued)

port for coolant is provided at the center of rotation of the end face portion.

20 Claims, 16 Drawing Sheets

Related U.S. Application Data continuation of application No. 14/964,183, filed on Dec. 9, 2015, now Pat. No. 10,335,870, which is a continuation of application No. 12/750,701, filed on Mar. 30, 2010, now Pat. No. 9,227,253.

(60) Provisional application No. 61/164,902, filed on Mar. 30, 2009.

(58) Field of Classification Search
CPC .......... B23C 2210/203; B23C 2210/40; B23C 2210/54; B23C 3/28; B23B 51/02; B23B 51/042; B23B 51/06; B23B 51/068
See application file for complete search history.

(56) References Cited

U.S. PATENT DOCUMENTS

| | | | |
|---|---|---|---|
| 3,293,727 A | 12/1966 | Simms | |
| 4,810,136 A | 3/1989 | Paige | |
| 5,094,573 A * | 3/1992 | Hougen | B23C 5/10 407/53 |
| 5,322,394 A | 6/1994 | Okanishi et al. | |
| 5,851,094 A * | 12/1998 | Strand | B23B 31/1122 409/234 |
| 5,893,683 A * | 4/1999 | Johnson | B23C 5/109 407/53 |
| 6,056,485 A | 5/2000 | Magill | |
| 6,368,030 B1 | 4/2002 | Sato | |
| 6,435,780 B1 | 8/2002 | Flynn | |
| 6,719,501 B2 | 4/2004 | Sekiguchi | |
| 6,899,494 B2 | 5/2005 | Walrath | |
| 6,997,651 B2 | 2/2006 | Kawai et al. | |
| 7,037,049 B2 | 5/2006 | Toublanc | |
| 7,207,755 B2 | 4/2007 | Berglow | |
| 7,374,374 B2 * | 5/2008 | Berglow | B23C 5/10 408/59 |
| 7,402,004 B2 * | 7/2008 | Tanaka | B23C 5/10 407/53 |
| 7,451,013 B2 | 11/2008 | Coleman et al. | |
| 7,563,059 B2 | 7/2009 | Song | |
| 7,577,490 B2 | 8/2009 | Diehl et al. | |
| 8,560,113 B2 | 10/2013 | Diehl et al. | |
| 8,657,538 B2 | 2/2014 | Pan et al. | |
| 9,227,253 B1 | 1/2016 | Swift et al. | |
| 9,878,379 B2 | 1/2018 | Davis | |
| 10,335,870 B2 | 7/2019 | Swift et al. | |
| 2002/0067964 A1 * | 6/2002 | Sekiguchi | B23C 5/10 407/119 |
| 2007/0258777 A1 * | 11/2007 | Gunther | B23C 5/10 407/113 |
| 2007/0286691 A1 | 12/2007 | Glimpel | |
| 2009/0232610 A1 | 9/2009 | Takagi | |
| 2010/0008736 A1 * | 1/2010 | Matsunaga | B23C 5/10 408/230 |
| 2015/0037105 A1 | 2/2015 | Fukata et al. | |
| 2017/0008098 A1 | 1/2017 | Kuroda | |
| 2019/0329333 A1 | 10/2019 | Swift et al. | |

FOREIGN PATENT DOCUMENTS

| | | |
|---|---|---|
| JP | 2006 110683 A | 4/2006 |
| JP | 2007 136627 A | 6/2007 |
| WO | WO 2003024661 A1 | 3/2003 |
| WO | WO 2013121993 A1 | 8/2013 |

OTHER PUBLICATIONS

JP 2007 136627 A—Machine translation, (9pgs) see pp. 4-9 (year: 2021) + EPO—Patent Translate—English translation of claims and description (18 pgs).
WO 2013 121993 A1—Aug. 22, 2013 Mitsubishi Materials Corp (JP) WIPO (Patentscope—English Translation—Bibliographical Data/ Abstract (1 pg).
WO 2013 121993 A1—Aug. 11, 2013 English Translation—EPO Patent Translate—Claims and Description (10pgs).
WO 2013 121993 A1—PCT/JP2013/052994, Mitsubishi Materials Corporation. PCT International Search Report (Japanese Language) (2pgs) with International Preliminary Report on Patentability and PCT International Search Report—(Aug. 19, 2014) English translation (6 pgs).

* cited by examiner

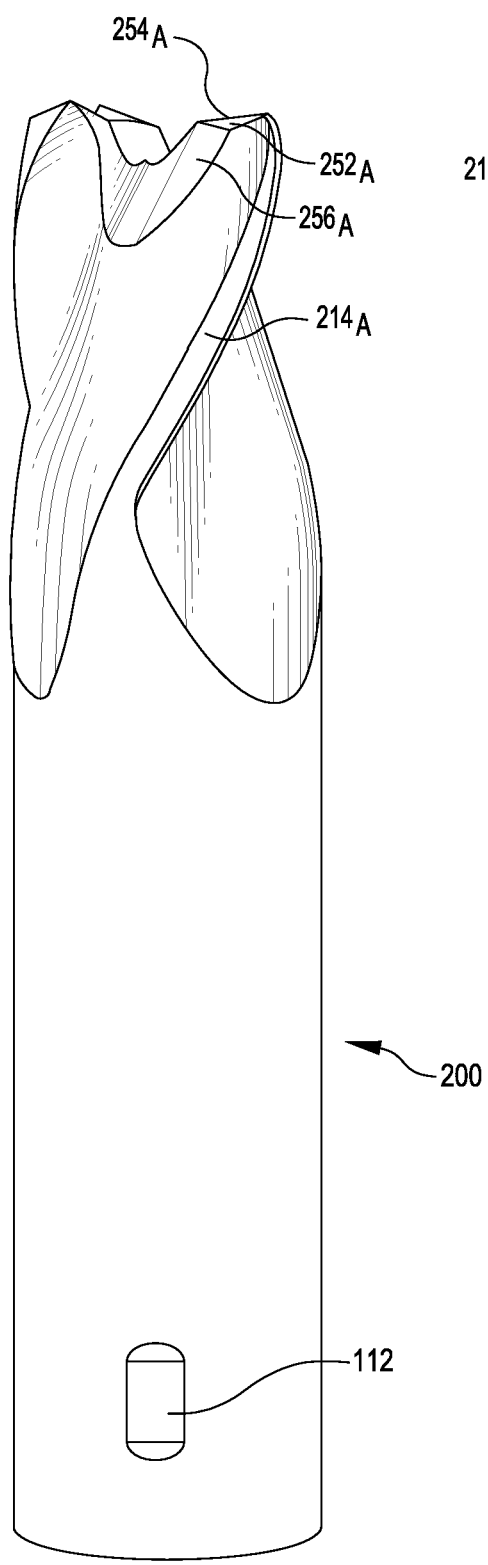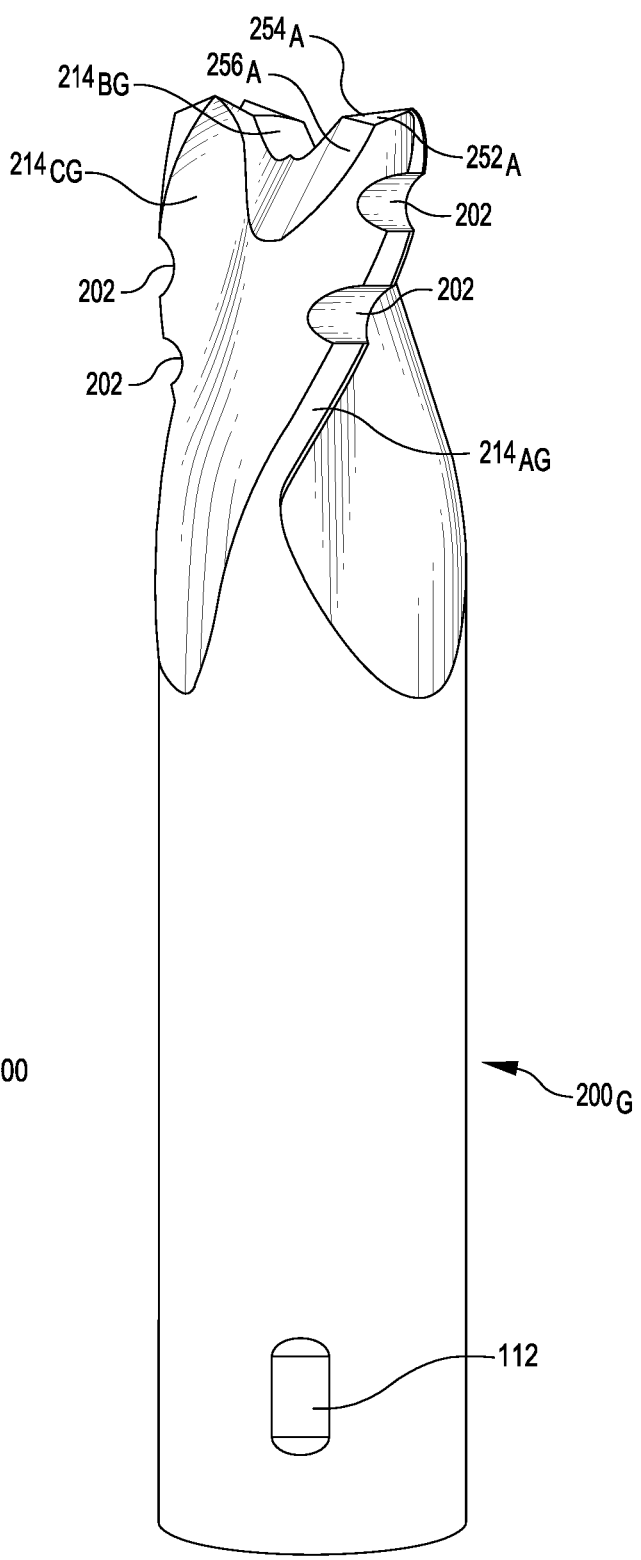

ROTARY CUTTER FOR MACHINING MATERIALS

RELATED PATENT APPLICATIONS

This application is a continuation of prior and now pending U.S. patent application Ser. No. 16/444,948 filed Jun. 18, 2019, which application claims priority under 35 USC § 120 and was a continuation of prior U.S. patent application Ser. No. 14/964,183 filed Dec. 9, 2015, (now U.S. Pat. No. 10,335,870 issued Jul. 2, 2019), which application claimed priority under 35 USC § 120 and was a continuation of U.S. application Ser. No. 12/750,701 filed on Mar. 30, 2010, (now U.S. Pat. No. 9,227,253 B1, issued Jan. 5, 2016), which application claimed priority from prior U.S. Provisional Patent Application Ser. No. 61/164,902, filed Mar. 30, 2009, entitled ROTARY CUTTER WITH MULTIPLE CUTTING EDGES. The disclosures of each of the just noted prior related patent applications is incorporated herein in their entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to rotary tools, and more specifically, to end mill cutting tools for use in multi-axis cutting machine operations.

BACKGROUND

In the machine tool industry, those of skill in the art will recognize that end mills are generally provided as cylindrically shaped cutting tools with a shank end and a cutting end having flutes (with or without helix design) that define side cutting edges which intersect with the end of the end mill, generally with a slight concave dish of from about 1 to about 3 degrees of inward dish angle (that is, from the radial edges inward toward the center of rotation). The existing end mill cutting tools of which we are aware are provided based on designs that are generally capable of plunging or pecking with multiple small axial steps, or which are capable of ramping at relatively slight angles, such as between about one-half (½) degree to about three (3) degrees. The actual degree of ramping achievable is often primarily dependent upon the machineability of the material being cut. In many such machine tool designs, exceeding such just mentioned ramping angles during machining on a workpiece causes elevated cutting forces, and possibly catastrophic failure, due to excessive tool to part contact. Such failures are, in part, due to inefficient geometry of cutting face design of such prior art tools.

To avoid such problems, various techniques have been developed, and such prior art techniques are presently widely used in machining workpieces. For example, the technique of pocketing may be utilized, wherein one first uses a drill to manufacture a hole, and then the end mill is inserted into the hole, and subsequently a slot is machined in a lateral direction. Another method, namely slotting, may be utilized, where an open end allows machining to start at an outside or exposed edge, and multiple slot cuts of shallow depth are utilized. The first approach, i.e. pocketing, requires the use of two tools—a drill and an end mill. Both techniques require multiple machining steps. Thus, both of those techniques are inefficient. Extra time is consumed during parts manufacture by the use of such processing techniques. And, in many respects, high or excessive cutting pressure may decrease tool life. Also, the cutting pressure or heat generated in such prior art techniques may decrease the quality of the part made from the workpiece being machined.

One relatively recent patent, namely U.S. Pat. No. 6,435,780, issued Aug. 20, 2002 to C. M. Flynn for a Rotary Cutting Tool has made an attempt at reducing forces encountered during end milling. However, only material listed in the published test results was 6061-T85 aluminum, which material is very easy to machine. Thus, such test results do not show that such designs are qualified to avoid problems which are inevitably encountered when ramp machining the many and various harder or higher tensile strength materials. In the tool disclosed in that patent, an end mill having a shank end and a cutting end having flutes defining side cutting edges is provided. However, a periphery end edge portion is defined that slopes at an angle which in various embodiments may be somewhere in the range of about two (2) degrees or slightly more, and an interior edge portion is defined that slopes at an angle in the range of five (5) to twenty five (25) degrees. Thus, while such an end mill design may help to reduce the forces while ramping, such design is faced with the problem of chipping or plastic deformation of the workpiece at the working face, e.g., the outer most corner of rotation of the tool. Further, it does not provide geometry for dampening or reducing the effects of model coupling (the effect of which would be tool chatter). When ramping at angles greater than about three (3) to five (5) degrees, the result in simultaneous multi-axis machining with such a tool is that the combined directional movements form a single chip at two adjacent shear zones. These zones are located around eighty six (86) degrees from each other at the outer most tip of the cutting edges of the radial diameter, where it meets the end cutting edge forming a sharp point or tip. In the case of that tool, the chip formed is in the same shear zone at the dish end of the end mill and the outside periphery, both intersecting at the tip or corner. When those two opposing faces form a simultaneous chip at the same shear zone or chip path, they collide and compress as their directional paths intersect each other. The effect of creating two chips simultaneously in the same shear zone is more than doubling in both heat and cutting pressure at such point of intersection. When such phenomenon occurs, chips are forced and buckled as neither the shear zone near the tip or at the tip itself has a clear path for chip flow. This leads to additional strain and increased forces as the chip is then cold formed in the gullet of the flutes, resulting in additional tool pressure and heat. At this point of intersection both the heat and cutting pressure or strain is increased at the weakest point of the tool, i.e., the corner of the tool. Also, such prior art tool design does not control or allow for sufficient room for chip flow. With no specific geometry for accommodating chip formation or chip removal paths, during use, such a tool would lead to higher tool pressure at such shear zones, leading to chipping of the corner of the workpiece, or wear of the workpiece due to plastic deformation from the resulting strain and heat.

Consequently, there still remains an as yet unmet need for an end mill tool design, and a method for operation of milling machines when using such end mill tools, that takes full advantage of improved mechanical design components with respect to cutting angles and cutting speed of the improved rotary cutters disclosed and claimed herein.

Moreover, it would be advantageous to accomplish such goals while providing a rotary cutting tool suitable for use in existing milling equipment, and while providing a procedure for modification of existing parts manufacturing programs, in order to increase productivity of manufacturing operations of machined parts, and especially, those machined parts that would benefit from high speed rough end milling operations.

SUMMARY

A high speed rotary cutting tool that is especially useful for high speed rough end milling operations is described herein. Such high speed rotary cutting tools, and in particular, end milling tools, provide significantly improved performance in the art of simultaneous multi axis machining. Importantly, the high speed rotary cutting tool, and in particular, end milling tools taught herein, allow machining operations at increased surface speeds, with higher workpiece feed rates, yet while providing increased rotary cutting tool life.

As a result of advances in machine tools (e.g., computer numeric control or "CNC" machine tools), and computer aided machining software ("CAM" software), cutter paths can be provided in terms of constant tool engagement angle. Rotary cutting tools can be controlled by algorithms in software to provide a consistent chip in terms of chip length and a chip thickness. Such constant tool engagement angles are generally provided in terms of not to exceed ramp angle or engagement speed, regardless of a varying cutter path. This technique in turn produces relatively uniform chips that are roughly equal in length given a consistent thickness and duration of cut. Such machining techniques provide relatively consistent cutting forces in terms of loads, heat generated, and time exposed to heat, thereby limiting the forces and temperatures allowed to be reached. Such machinery and software thus allows for the use of rotary cutters, provided such cutters have the cutting geometry that can facilitate running at much higher surface feet per minute rates. Such improved rotary cutters can employ aggressive ramp angles, circular interpolated plunging, or helical interpolation, as cutter paths for entry into the workpiece material. By providing a novel rotary cutter design as described herein, the capability of presently available machine tools and their software can be exploited, and thus provide significantly improved productivity and capability in a milling cutter. Further, novel rotary cutting tool designs enable multi-axis directional feeds, and machining surface speeds that heretofore have been impossible to reliably and consistently obtain in the use of multidirectional rotary cutters, especially rotary end mill cutters.

An improved rotary cutter is provided in a configuration especially suited for, but not limited in use to, rough end milling of workpieces, such as metallic parts. The rotary cutter has a body with a shank portion having a lower end, and a cutting portion. The cutting portion has flutes extending upward along said body from a lower or proximal flute end. In an embodiment, helical flutes may be provided. The flutes have a leading edge land portion that is provided as a narrow land width, which in an embodiment is of the same diameter as the shank of the cutter, and at the leading edge thereof a flute cutting edge is provided. Rearward of the flute cutting edge and the narrow width land, rotationally, is at least one margin relief portion, which in an embodiment may be an eccentric relief margin. The rotary cutter has a face portion having a plurality of face cutting edge portions. Various embodiments may be provided with the number of face cutting edge portions ranging, for example, in the range of two (2) to seven (7) flutes for cutters in the range of from about one-eighth (⅛) inch or less to about one and one-half (1.5) inches or so. The face cutting edge portions are provided at the rotationally forward edge of a downwardly and inwardly sloping first dish portion. Corner blend portions are provided which extend from the flute cutting edge to corresponding face cutting edge portions. In an embodiment, the corner blend portions have an outer surface curvature defined by a segment of curvature shaped from a conic element, and wherein said segment of curvature is truncated before becoming tangential to said cutting edge portion. In various embodiments, the segment of curvature may be truncated at from between about four (4) degrees and about seventy (70) degrees before the segment of curvature becomes tangential to the face cutting edge portion. In an embodiment, the corner blend portions may be provided by a chamfer configuration. In various embodiments, the first dish portion is provided sloping inwardly at an angle in the range of from about five point five (5.5) degrees to about twenty five (25) degrees. For example, in an embodiment, a rotating cutter having three flutes may be provided with a first dish portion that is sloping downwardly and inwardly at an angle of about twelve point five (12.5) degrees. For example, in an embodiment, a rotating cutter having five flutes may be provided with a first dish portion that is sloping downwardly and inwardly at an angle of about eight point five (8.5) degrees. And, in a further embodiment, a rotating cutter having seven flutes may be provided with a first dish portion that is sloping downwardly and inwardly at an angle of about six (6) degrees. Further, in various embodiments, a second dish portion is provided that downwardly and inwardly slopes at an angle in the range of from about twenty five (25) to about seventy (70) degrees. In various embodiments, coolant passageways are provided to support lubrication and cooling between the rotary tool and the workpiece, and to support removal of chips.

In an embodiment, such new high speed rotary cutting tools may enable the operator of milling equipment to substantially increase the throughput of parts in current milling equipment, by substantially increasing the speed of milling, commonly measured, in one aspect, as surface feet per minute ("SFM") that a cutting tool moves through a workpiece, i.e., the surface speeds maintained during cutting, or in another aspect as machine removal rate ("MRR"), i.e, the amount of material removed from a workpiece per unit of time. In an embodiment, such high speed rotary cutting tools are capable of creating relatively uniform chips from workpieces while working at high surface speeds on a workpiece. In yet another embodiment, such high speed rotary cutting tools are capable of providing cooling and lubrication while operating at high surface feed per minute through a workpiece, thus further enhancing their utility and increasing productivity in milling machinery utilizing such new rotary cutting tools.

BRIEF DESCRIPTION OF THE DRAWING

The present invention will be described by way of exemplary embodiments, using for illustration the accompanying drawing in which like reference numerals denote like elements, and in which:

FIG. 7 shows another embodiment of a rotary cutting tool, now showing the use of three flutes with flute cutting edge portions and three face cutting edge portions, as well as the use of a mechanical flat or indexing slot for locating the shank portion of the tool in a milling machine.

FIG. 8 shows yet another embodiment of a rotary cutting tool, similar to the tool just shown in FIG. 7, but here further showing the use of smoothly radiused coolant/chip passageways along the flutes.

Figure 1:
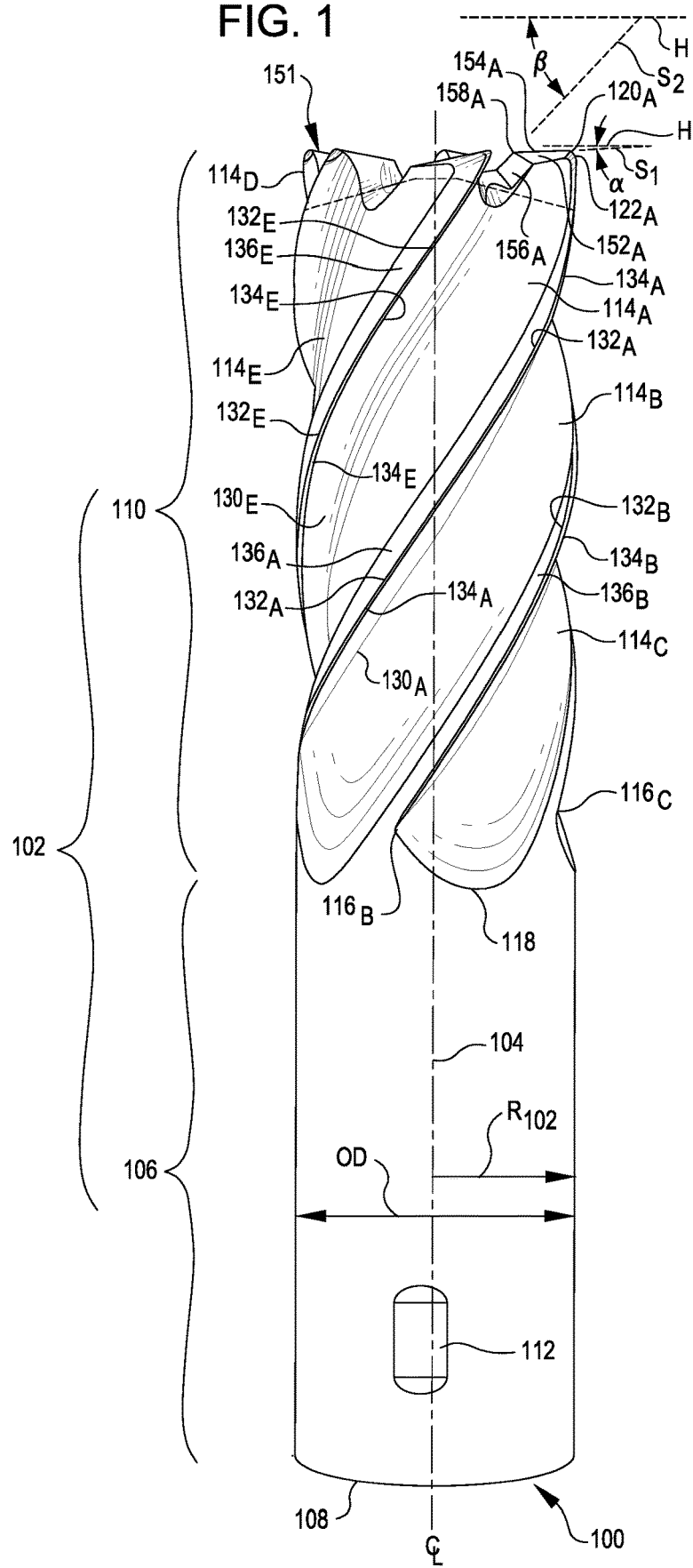
FIG. 1 is a side elevation view of an embodiment of a rotary cutting tool, wherein the cutting tool comprises five flutes and uses a mechanical flat or indexing slot for locating the shank portion of the tool in a milling machine.

The foregoing figures, being merely exemplary, contain various elements that may be present or omitted from actual rotary cutting tool designs for endmills or other tools as taught herein, or in methods that may be implemented for use of such tools. Other rotary tool designs may use slightly different mechanical configurations, but be mechanically designed with a configuration as is described for utilizing elements described herein or depicted in the drawings shown herein. An attempt has been made to draw the figures in a way that illustrates at least those elements that are significant for an understanding of the various tool designs and methods taught herein for improving the efficiency of milling operations when utilizing tool designs as set forth herein. Further, it should be understood that groupings of similar parts are noted with similar numbers having different subscript or other related indicia, and some parts specifically mentioned in the specification are not explicitly noted where not visible in the provided drawing figures, it being considered unnecessary to provide still further drawings to explain to those of skill in the art the structure of repeated yet separately noted components so noted and numbered. However, it should be understood that various features may be utilized in accord with the teachings hereof, as may be useful in different embodiments as necessary or useful for cutting various materials or as may be desirable depending upon the end uses of such workpieces.

DETAILED DESCRIPTION

An exemplary rotary cutting tool design is set forth herein, as well as a method for use of such tools in milling machines to improve manufacturing productivity. Attention is directed to FIG. 1, which illustrates an end mill type milling cutter 100, which has a cylindrically shaped body 102 having a longitudinal axis noted by centerline 104. The body 102 has a shank portion 106 with lower end 108, and a usable cutting portion 110. As further explained hereinbelow (and briefly noted in FIG. 2) a selected axial depth of cut (ADC) in the range of from about one point five (1.5) times the outside diameter (OD) of a cutter 100 to about three (3) times the outside diameter (OD) of a cutter 100 may be advantageously achieved where the usable cutting portion 110 is of sufficient length $A_L$. Shank portion 106 may include a machine mounting feature 112 such as a flat shown in this FIG. 1. In other embodiments, alternate machine mounting features may include Weldon flats, a whistle notch, a straight flat, a flat groove, or a radial groove, for securing the shank portion 106 in a tool holder (not shown) in a milling machine (not shown).

The cutting portion 110 may, in an embodiment such as shown in FIG. 1, have a plurality of circumferentially extending ribs such as flutes 114, which flutes are discretely and individually identified by reference numerals $114_A$, $114_B$, $114_C$, $114_D$, and $114_E$. In an embodiment, such as is shown in FIG. 1, the flutes 114 may be provided in a generally spiraling configuration about a cylindrically shaped body 102. In an embodiment, the flutes 114 may be provided in a helical configuration spaced around cutting portion 110. In an embodiment, a flute 114 such as the discrete flute $114_A$ runs from a proximal or lower flute end (for example, see $116_B$ or $116_C$) adjacent the transition point 118 of the shank portion 106 up to a distal end $120_A$ at the corner blend portion $122_A$. It will be understood to those of skill in the art and to whom this specification is directed that corresponding parts for other flutes will have, in an embodiment, similar features, and thus repetition of companion reference numbers for corresponding parts is thus unnecessary. Likewise, common parts may be shown in the drawings with differing subscript suffix to differentiate between similar elements, without the necessity to repeat the precise identification of each similar element using a different subscript suffix. As shown, the cutting portion 110 is provided with a plurality of flutes, which in the embodiment shown in FIG. 1 is five flutes, namely flutes $114_A$, $114_B$, $114_C$, $114_D$, and $114_E$. However, different embodiments of a rotary cutting tool may be provided with one or more flutes, and more typically, with two or more flutes, and even more typically, with three or more flutes. Other embodiments are shown and described below having four flutes, five flutes, six flutes, and even seven flutes, all in accord with the teachings hereof.

For purposes of illustration, attention will be directed to a single flute $114_A$, however, it should be appreciated that for the present embodiment, such discussion may be applied generally to the various flutes on milling cutter 100. The cutting portion 110 of the milling cutter 100 has flutes such as flute $114_A$ with an undercut portion such undercut $130_A$ that provides a gullet between adjacent flutes such as between flutes $114_A$ and $114_B$. The flute $114_A$ has a leading edge land portion $132_A$ that has a flute cutting edge $134_A$. With respect to the orientation of the flute relative to the undercut $130_A$ and the flute cutting edge $134_A$, the flute $114_A$ may be provided with a rake angle or orientation that, in an embodiment, may be negative, or neutral, or in the embodiment shown in FIGS. 1, 2, and 3, may be positive. In an embodiment, the flute cutting edge $134_A$ may be provided in a generally circumferential configuration, in that the flute cutting edge $134_A$ may be located at the periphery (i.e. about the outer diameter "OD") of the generally cylindrically shaped cutter body 102. The leading edge land portion $132_A$ is provided without relief, and thus for its very narrow length rearward from the flute cutting edge $134_A$, may be provided as a short arcuate land having the radius $R_{102}$ of the cutter body 102. Rearward of the leading edge land portion $132_A$ there is provided at least one margin relief portion $136_A$, which in an embodiment, may be an eccentric shaped relief margin. Thus, the at least one margin relief portion $136_A$, especially when provided in eccentric configuration, provides increasing in clearance rearward from the point of intersection of a workpiece with leading edge land portion $132_A$ behind the flute cutting edge $134_A$. In an embodiment, the flute cutting edge $134_A$ may be provided as a honed edge. Similarly, in an embodiment, the face cutting edge portions $154_A$ (discussed below) may be provided as a honed edge.

Figure 12:
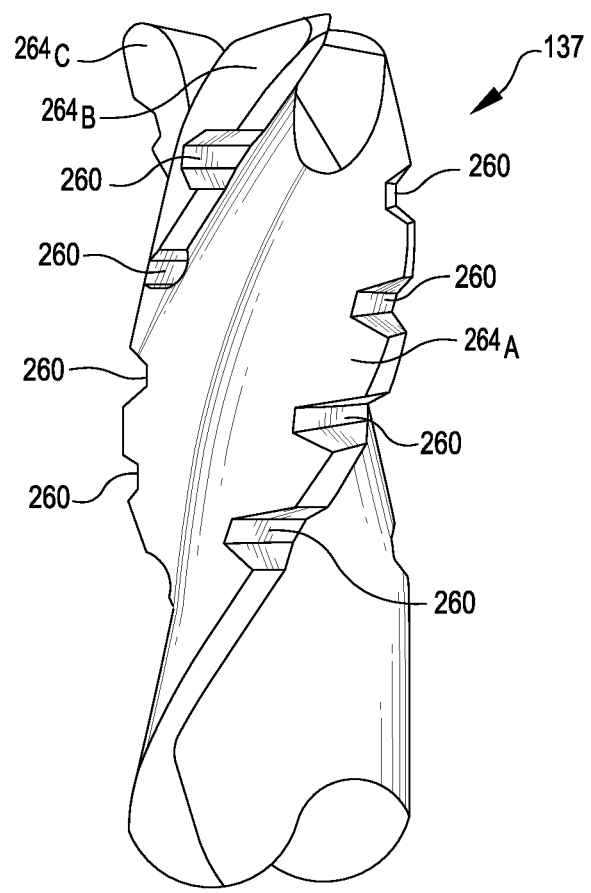
FIG. 12 is a side elevation view of the rotary cutter similar to that just shown above in FIG. 8, but now showing the use of a longer flute cutting edge having a plurality of v-shaped notched coolant/chip passageways along the flutes.
Figure 13:
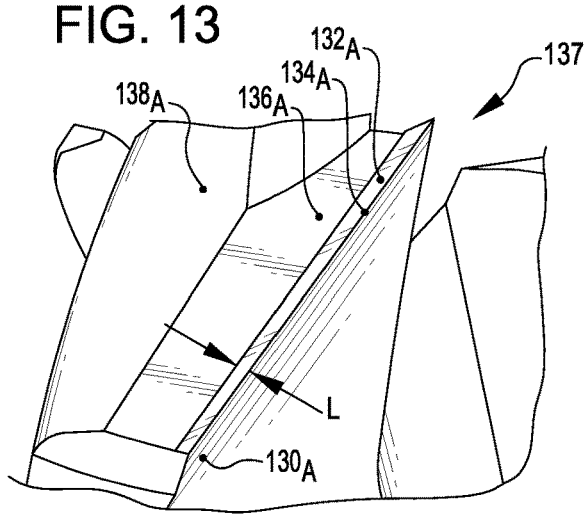
FIG. 13 is a close-up view a portion of a flute of the embodiment just illustrated in FIG. 12 above, now showing in detail a narrow leading edge land portion having a circular grind, thus providing an arcuate land shape, and having a honed flute cutting edge at the forward or rotary edge of the leading edge land portion, as well as showing an eccentric margin relief portion.

Attention is directed to FIGS. 12 and 13, wherein in FIG. 12, a three flute cutter 137 is provided, and wherein in FIG. 13, the just mentioned details of flute cutting edge $134_A$, and the leading edge land portion $132_A$ provided without relief are shown in enlarged detail. In FIG. 13, it is easy to see that for its very narrow length rearward from the flute cutting edge $134_A$, the leading edge land portion $132_A$ is provided without relief, as a short arcuate land having the radius $R_{102}$ of the cutter body 102 (see FIG. 3). Thus, the leading edge land portions $132_A$ operate as arcuate lands moving along the periphery P of cutter rotation, which is at the circumference of the cutter 100C as defined by the outer diameter OD of the body of cutter 100C, as noted in the cutting face view of FIG. 6. The leading edge land portions $132_A$ are provided in a selected length L (see FIG. 13) of from about 0.0001 inches to about 0.002 inches, rearward of said flute cutting edge $134_A$, based on said rotary cutter outer diameter (OD), which for example, is two times $R_{102}$ as depicted in FIG. 1), as set forth in the following table:

| OD (inches) | selected length L (inches) |
|---|---|
| Under 1/8 | .00010 to .0005 |
| 1/8 to 3/16 | .00010 to .0010 |
| 3/16 to 1/4 | .00015 to .0012 |
| 1/4 to 5/16 | .00020 to .0015 |
| 5/16 to 3/8 | .00025 to .0015 |
| 3/8 to 1/2 | .00030 to .0015 |
| 1/2 to 5/8 | .00035 to .00175 |
| 5/8 to 3/4 | .00040 to .0020 |
| 3/4 to 1 | .00045 to .0020 |
| 1 to 1.5 | .00050 to .0020 |
| Over 1.5 | .00050 to .0020. |

Further, the detail of FIG. 13 also shows the use of at least one margin relief portion $136_A$, which in an embodiment, may be an eccentric shaped relief margin. As also seen in FIG. 13, a second relief margin $138_A$ is provided. Thus, it may be clearly seen that the at least one margin relief portion $136_A$ when provided in eccentric configuration, provides increasing working clearance rearward from the point of intersection a workpiece with leading edge land portion $132_A$. While the least one margin relief portion $136_A$ in the flutes is shown with an elliptical relief margin, which is often the most practical configuration, it should be understood that the least one margin relief portion $136_A$ may alternately be provided as a straight relief angled surface, as well as a curved relief surface, whether radial, elliptical, or other conic configuration.

Figure 2:
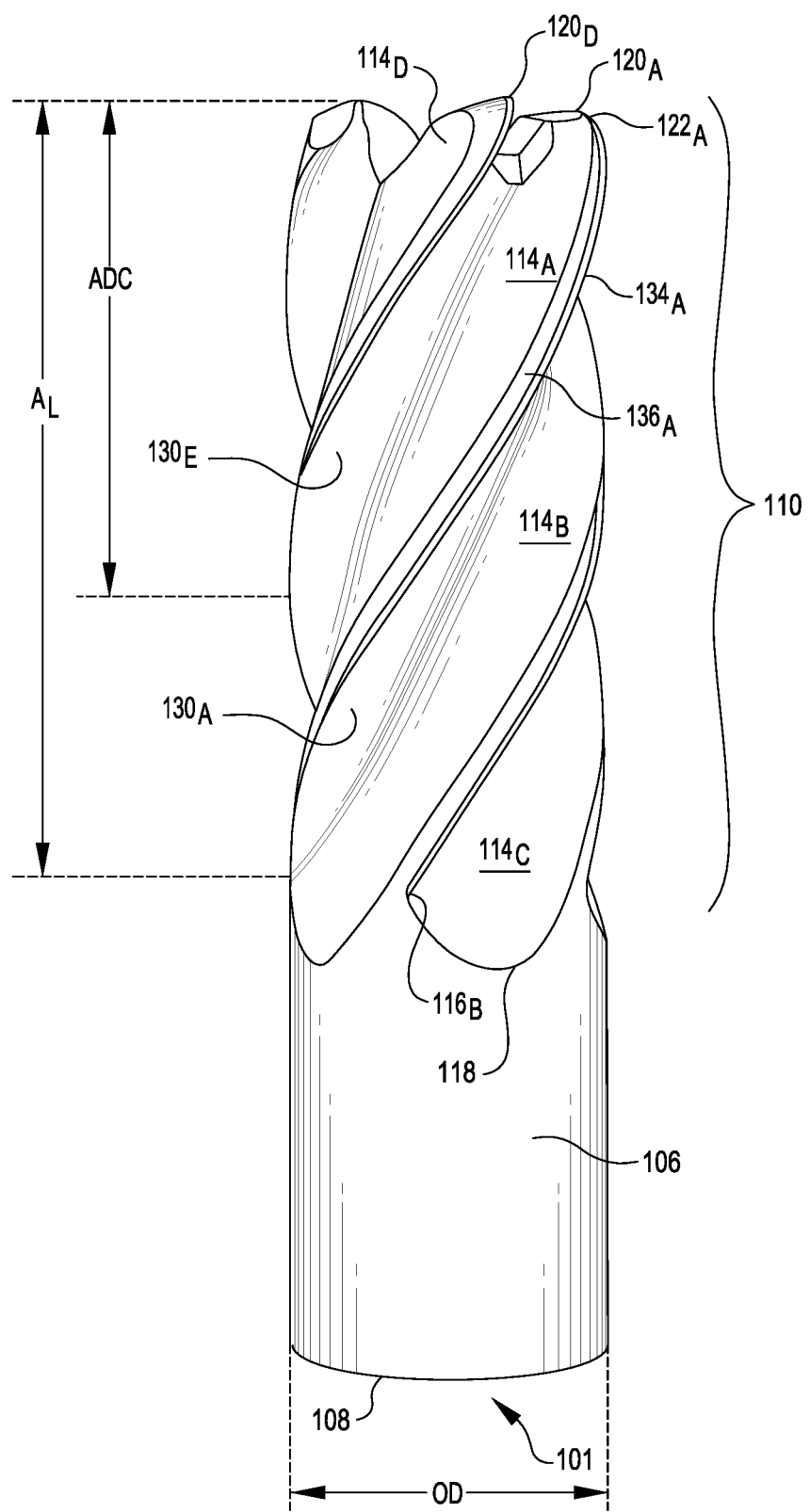
FIG. 2 is a side elevation view of an embodiment of a rotary cutting tool, similar to the view just shown in FIG. 1, but now showing a shorter tool without an indexing slot for securing the shank portion in a milling machine.
Figure 3:
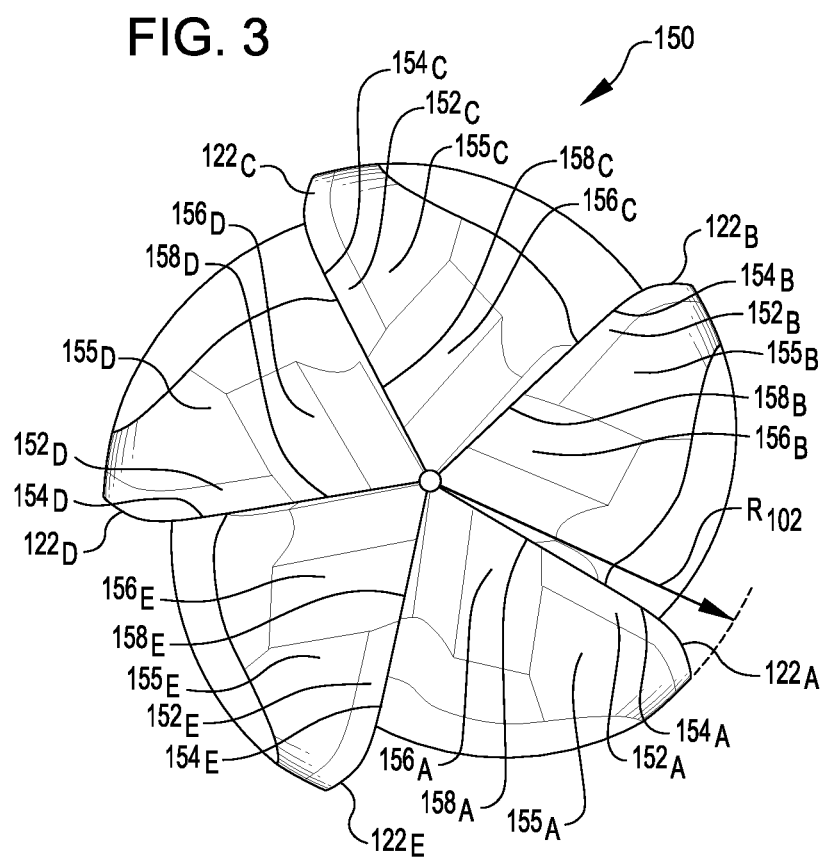
FIG. 3 provides a face end view of a rotary cutting tool just illustrated in FIG. 2 above, now showing the face portion of the cutting tool with five face cutting edge portions, and a downwardly and inwardly sloping first dish portion adjacent each face cutting edge portion, a further downwardly and inwardly sloping second dish portion inwardly adjacent the first dish portion, as well as corner blend portions extending from each flute cutting edge portion to each face cutting edge portion.

Attention is now directed to FIGS. 1, 2, and 3, with respect to the cutting end or face portion 150 of cutter 101 depicted in FIG. 3. A first dish portion $152_A$, $152_B$, $152_C$, $152_D$, $152_E$ (extending from each flute that runs to the upper end 151 of the cutter 100, respectively) slopes downwardly and inwardly (along respective first face cutting edge portions $154_A$, $154_B$, $154_C$, $154_D$, $154_E$) at a first dish angle alpha ($\alpha$). In an embodiment, the first dish angle alpha ($\alpha$) may be in the range of from about 6 degrees to about 25 degrees. As shown in FIG. 1, first dish angle alpha ($\alpha$) is represented as between a line H perpendicular to the longitudinal axis 104 and slope $S_1$ of the first dish portions $152_A$, $152_B$, $152_C$, $152_D$, and $152_E$. Separately, in an embodiment, a selected relief margin $155_A$, $155_B$, $155_C$, $155_D$, $155_E$ respectively (which may be flat as illustrated or with other configuration as desirable for a particular application) may be provided rotationally rearward of the first face cutting edge portions $154_A$, $154_B$, $154_C$, $154_D$, $154_E$ respectively.

Also as may be appreciated from FIGS. 1 and 3 together, a second dish portion, $156_A$, $156_B$, $156_C$, $156_D$, $156_E$ slopes downwardly and inwardly (along a respective second face cutting edge portions $158_A$, $158_B$, $158_C$, $158_D$, $158_E$, respectively) at a second dish angle beta ($\beta$). In an embodiment the second dish angle beta ($\beta$) may be in the range of from about 25 degrees to about 70 degrees. As shown in FIG. 1, second dish angle beta ($\beta$) is represented as between a line H perpendicular to the longitudinal axis 104 and slope $S_2$ of the second dish portions $156_A$, $156_B$, $156_C$, $156_D$, and $156_E$. Separately, in an embodiment, a selected relief margin (which may be flat as illustrated or with other shape (see FIGS. 18A, 18B, 18C, and 19) as may be desirable for a particular application) may be provided rotationally rearward of the second face cutting edge portions $158_A$, $158_B$, $158_C$, $158_D$, $158_E$, respectively.

Further attention is directed to FIGS. 1, 2, and 3 together, where the corner blend portions ($122_A$, $122_B$, $122_C$, $122_D$, $122_E$, respectively) are shown extending from their respective flute cutting edge ($134_A$, $134_B$, $134_C$, $134_D$, $134_E$, respectively, noting that $134_C$ and $134_D$ are not shown but are similar to their illustrated counterparts) to their companion first face cutting edge portions ($154_A$, $154_B$, $154_C$, $154_D$, $154_E$, respectively). The corner blend portions $122_A$, etc. may be provided in various precise shapes as appropriate for a particular service. In an embodiment, as shown in FIG. 1, the corner blend portions $122_A$, etc. have an outer surface curvature 159 defined by a segment of curvature shaped from a conic element. In an embodiment, the conic element defining the outer surface of the corner blend portions $122_A$ etc. may be provided at least in part by an elliptical shaped surface element. In an embodiment, the conic element defining the outer surface of the corner blend portions $122_A$ etc, may be provided at least in part by segments from a hyperbolic shaped surface element. In an embodiment, the conic element defining the outer surface of the corner blend portions $122_A$ etc. may be provided at least in part by a circular shaped surface element having a radius $R_C$, as noted in FIG. 18A.

Figure 18A:
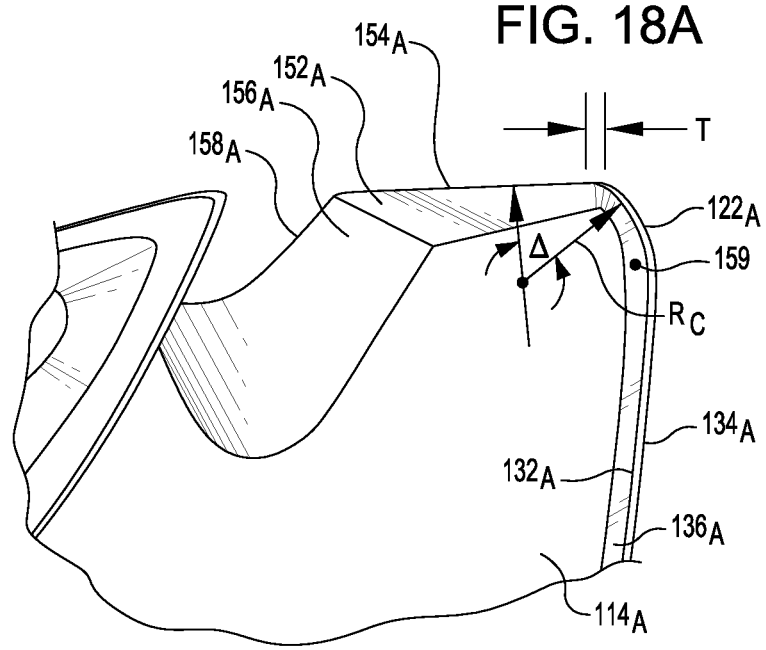
FIG. 18A provides a perspective view of a portion of a rotary cutter, showing one embodiment for a corner blend portion, wherein a non-tangential intersection is provided with the first dished portion.

As also shown in FIG. 18A, in an embodiment that is useful for controlling chip size and to enhance cutting ability of a rotary cutter provided as described herein, the segment of curvature used to provide the corner blend portions $122_A$, etc. may be truncated before becoming tangential to their respective face cutting edge portion, e.g., first face cutting edge portion $154_A$ By one measure, in various possible embodiments, the segment of curvature used to provide the corner blend portions $122_A$, etc. may be truncated by an angle delta ($\Delta$) of from about four (4) degrees to about seventy (70) degrees before the segment of curvature defining the corner blend portion, e.g., $122_A$ becomes tangential to the first face cutting edge portion $154_A$. In some embodiments, the segment of curvature used to provide the corner blend portions $122_A$, etc. may be truncated by an angle delta ($\Delta$) of from about five (5) degrees to about thirty five (35) degrees before the segment of curvature defining the corner blend portion, e.g., $122_A$ becomes tangential to the first face cutting edge portion $154_A$. In some embodiments, the segment of curvature used to provide the corner blend portions $122_A$, etc. may be truncated by an angle delta ($\Delta$) of from about ten (10) degrees to about twenty five (25) degrees before the segment of curvature defining the corner blend portion, e.g., $122_A$ becomes tangential to the first face cutting edge portion $154_A$. By another measure, in an embodiment, and as also depicted in FIG. 18A, the segment of curvature used to provide the corner blend portions $122_A$, etc., may be truncated with about 0.002 inches or more spacing T before such segment of curvature defining the corner blend portion, e.g., $122_A$ becomes tangential to the first face cutting edge portion $154_A$. In other embodiments, by similar measure, the segment of curvature used to provide the corner blend portions $122_A$, etc. may be truncated with between about 0.003 inches and about 0.0005 inches of spacing T before such segment of curvature defining the corner blend portion, e.g., $122_A$ becomes tangential to the first face cutting edge portion $154_A$.

In an embodiment, as can also be appreciated by reference to FIG. 18A, the corner blend portions $122_A$ etc. may be blended tangential to the respective flute cutting edge $134_A$, etc. to provide a smooth blend from the periphery of the cutter 101 upwardly extending toward the respective first dish portions $152_A$, etc., by fully utilizing the radius $R_C$ to the outer diameter of the tool at the periphery, i.e., at flute cutting edge $134_A$ of flute $114_A$.

Figure 18B:
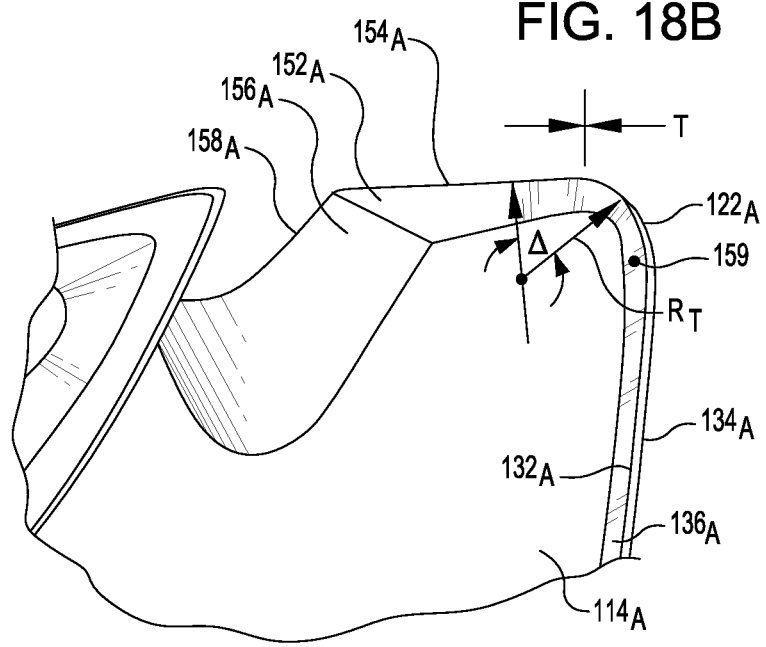
FIG. 18B shows a perspective view of a portion of a rotary cutter, showing an embodiment with a corner blend portion where a tangential or near tangential intersection is provided with the first dished portion.

In yet another embodiment, as illustrated in FIG. 18B, the corner blend portions $122_A$ etc. may be provided with an outer surface curvature defined by a segment of curvature shaped from a conic element, and wherein the segment of curvature is blended tangential to the first face cutting edge portion $154_A$. In such case, the spacing T is reduced to zero, as tangency is achieved between the corner blend portions $122_A$ etc. and the first face cutting edge portions $154_A$ and the like.

Figure 18C:
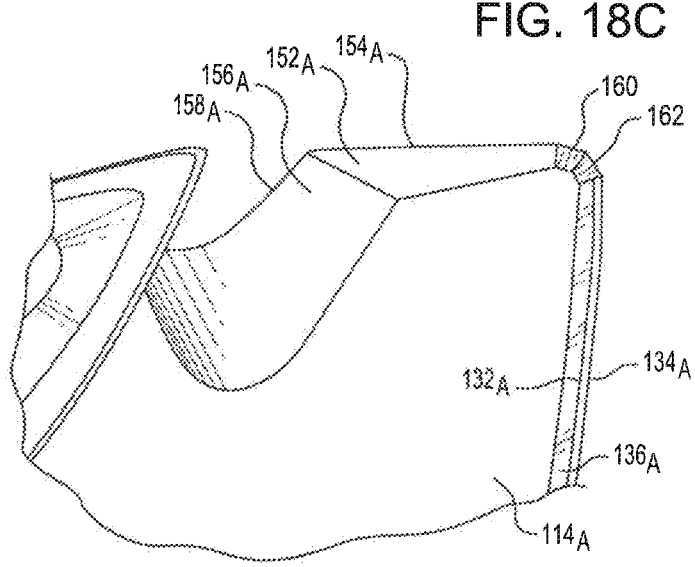
FIG. 18C provides a perspective view of yet another embodiment for a rotary cutter, illustrating the use of one or more chamfers to provide a suitable corner blend portion.

As seen in FIG. 18C, in yet another embodiment, the corner blend portions $122_A$, etc., may be provided with an outer surface profile defined by one or more chamfer portions 160 and 162.

Figure 4:
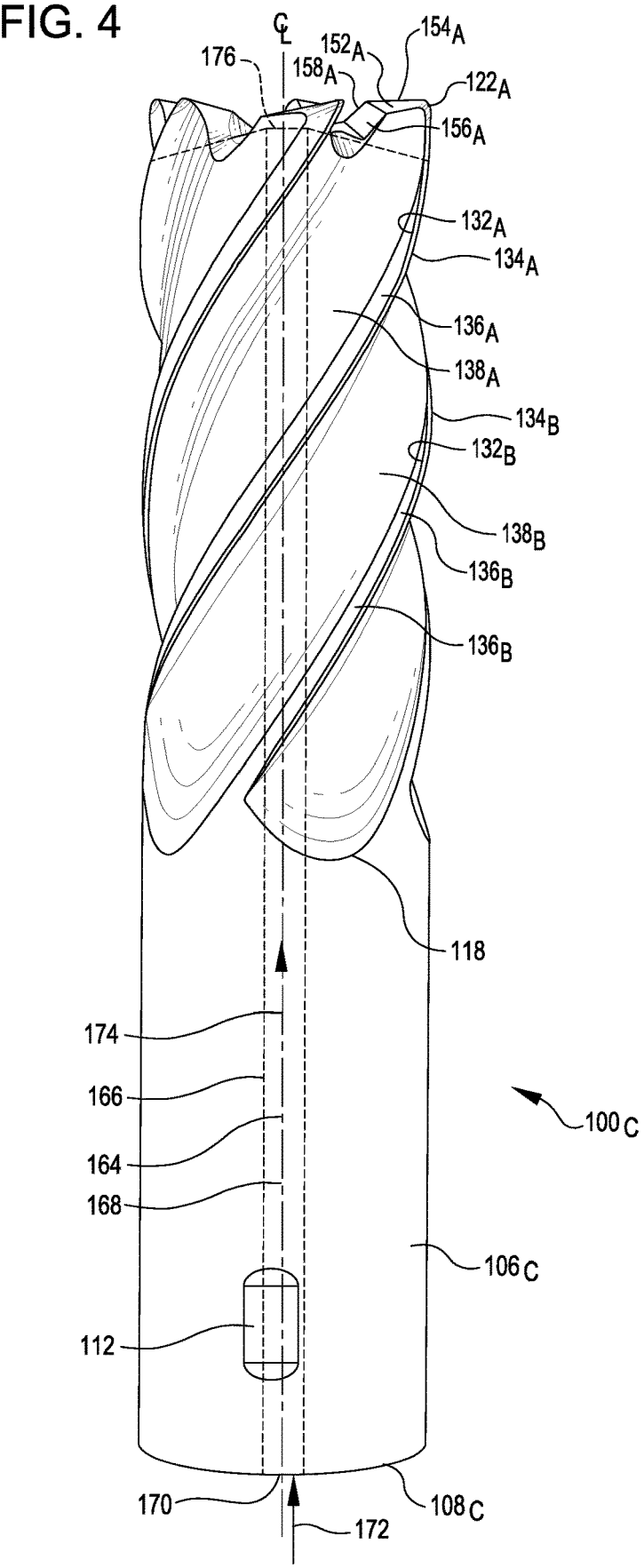
FIG. 4 provides a side elevation view of an embodiment of a rotary cutting tool, similar to that first shown in FIG. 1 above, now showing a cutting tool with five flutes, and which also utilizes a coolant passageway, here shown provided along a longitudinal axis at the rotational centerline.
Figure 5:
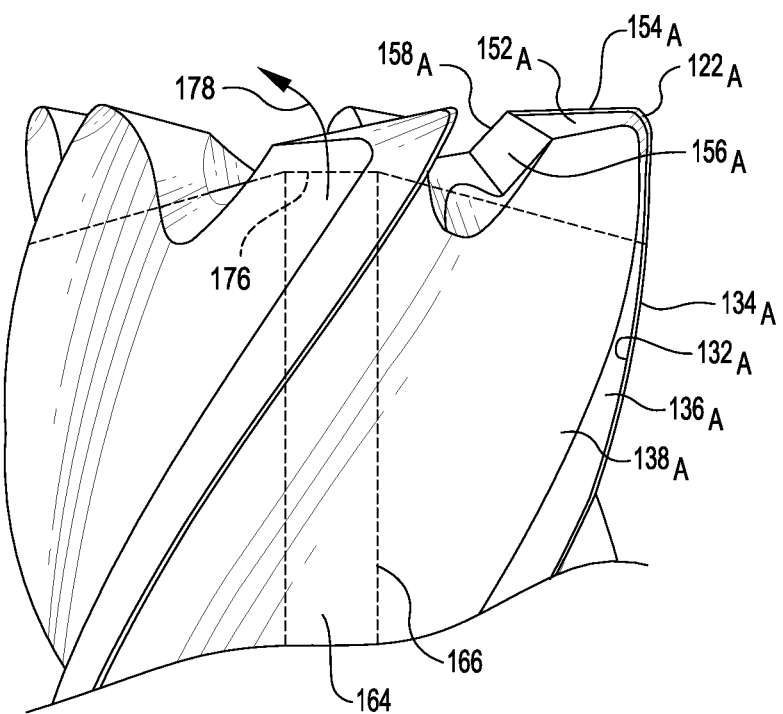
FIG. 5 is a detailed close up side view of the working end of the rotary cutter just shown in FIG. 4, now showing in detail the flutes and a thin leading edge land portion having a flute cutting edge, and an eccentric margin relief portion, and parts of the face portion, and the downwardly and inwardly sloping first dish portion adjacent each face cutting edge portion, and corner blend portions extending from flute cutting edge to the face cutting edge portions.
Figure 6:
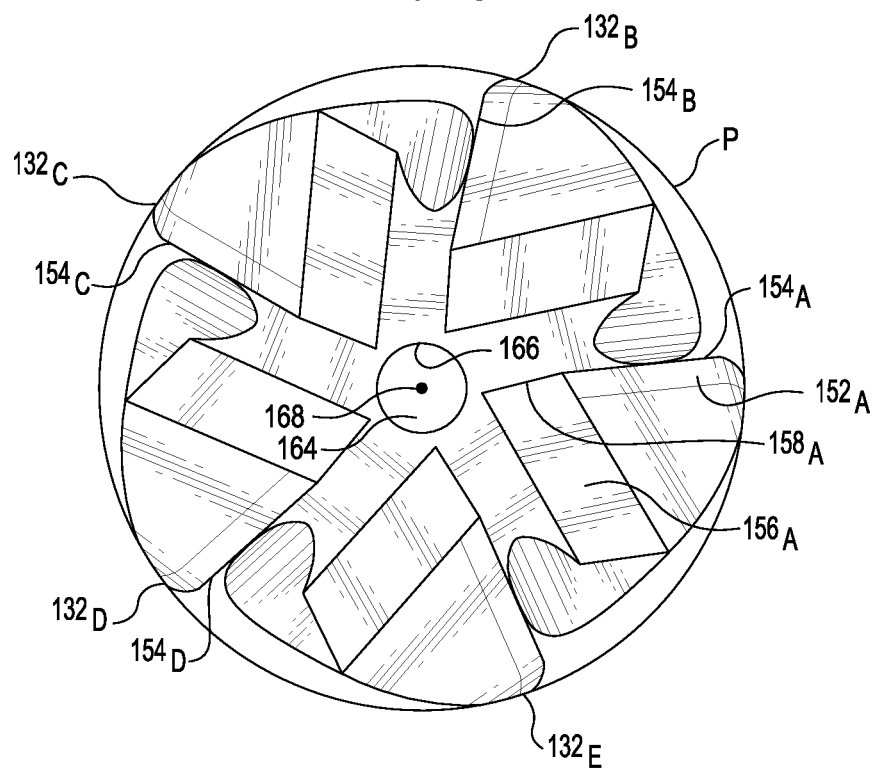
FIG. 6 is a face view of the rotary cutter just shown in FIG. 5 now showing in detail the parts of the face portion including the downwardly and inwardly sloping first dish portion adjacent each face cutting edge portion, the downwardly and inwardly sloping second dish portion, and corner blend portions extending from flute cutting edge to the face cutting edge portions.
Figure 9:
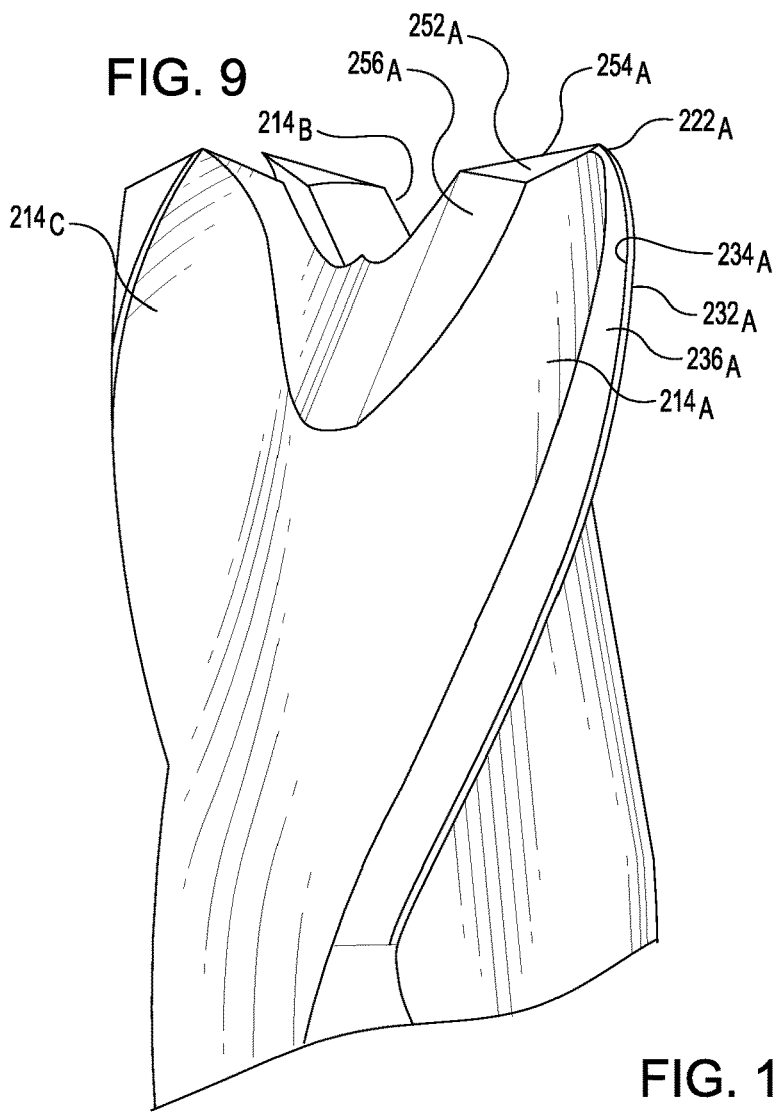
FIG. 9 is a detailed close up side view of the working end of the rotary cutter just shown in FIG. 7, now showing in detail the flutes and a thin leading edge land portion having a flute cutting edge, and an eccentric margin relief portion, and parts of the face portion, including the downwardly and inwardly sloping first dish portion adjacent each face cutting edge portion, and corner blend portions extending from flute cutting edge to the face cutting edge portions.

Attention is now directed to FIGS. 4, 5 and 6, wherein an embodiment for a rotary cutting tool is shown having at least one coolant channel passageway 164 defined by in this case by cylindrical interior edge walls 166. In this embodiment, the cooling channel is located along the rotational longitudinal centerline 168 of cutter $100_C$. The bottom $108_C$ of cutter $100_C$ provides an entry port 170 for coolant represented by reference arrow 172 to enter the shank portion $106_C$. Coolant is further represented by reference arrow 174 to be moving through cutter $100_C$, and then leaving cutter $100_C$ via exit port 176 as depicted by reference arrow 178, as better seen in FIG. 5.

Figure 4A:
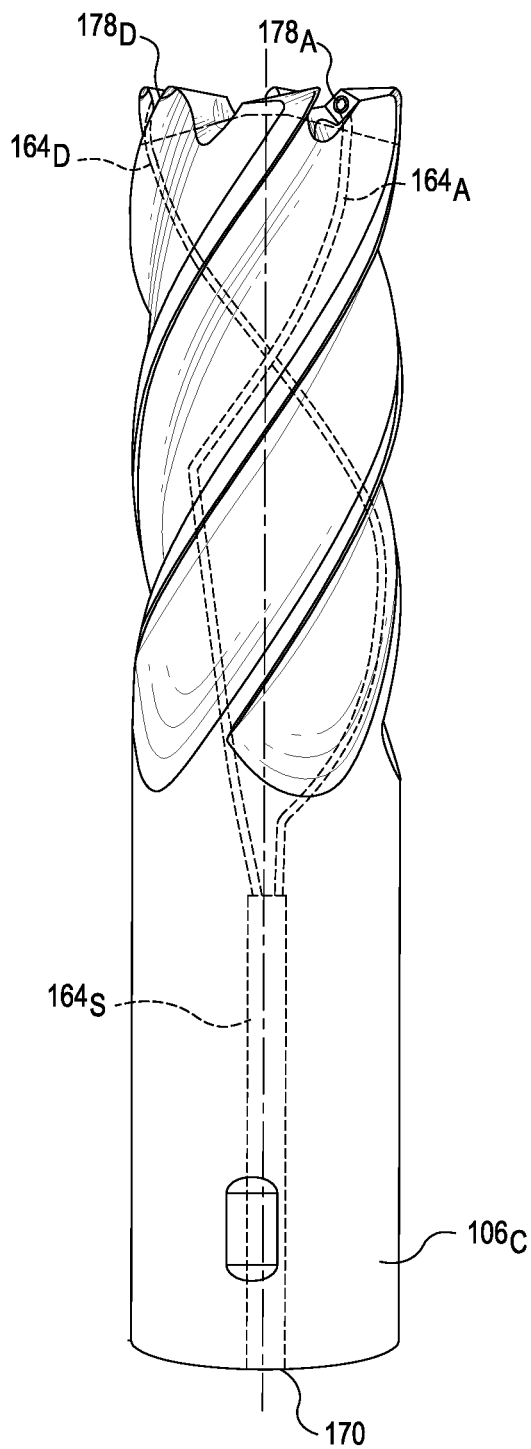
FIG. 4A provides a side elevation view of a rotary cutting tool, similar to that first shown in FIG. 4 above, now showing a cutting tool with five flutes, and which also utilizes a single entry port for a coolant passageway, but using multiple coolant passageways to feed coolant to various flutes.

Alternately, as depicted in FIG. 4A, coolant channels may be provided with entry port 170 to a common entry channel $164_S$ on the shank portion $106_C$, but with separate coolant channels in one or more flutes $114_A$ etc., and exit ports $178_A$, $178_D$, allowing coolant to be discharged indirectly from flutes as suitable for a particular application, such as at second dish portion $156_A$, (see FIGS. 4A and 4B) or gashes (see FIGS. 18A-18C and 19).

Figure 4B:
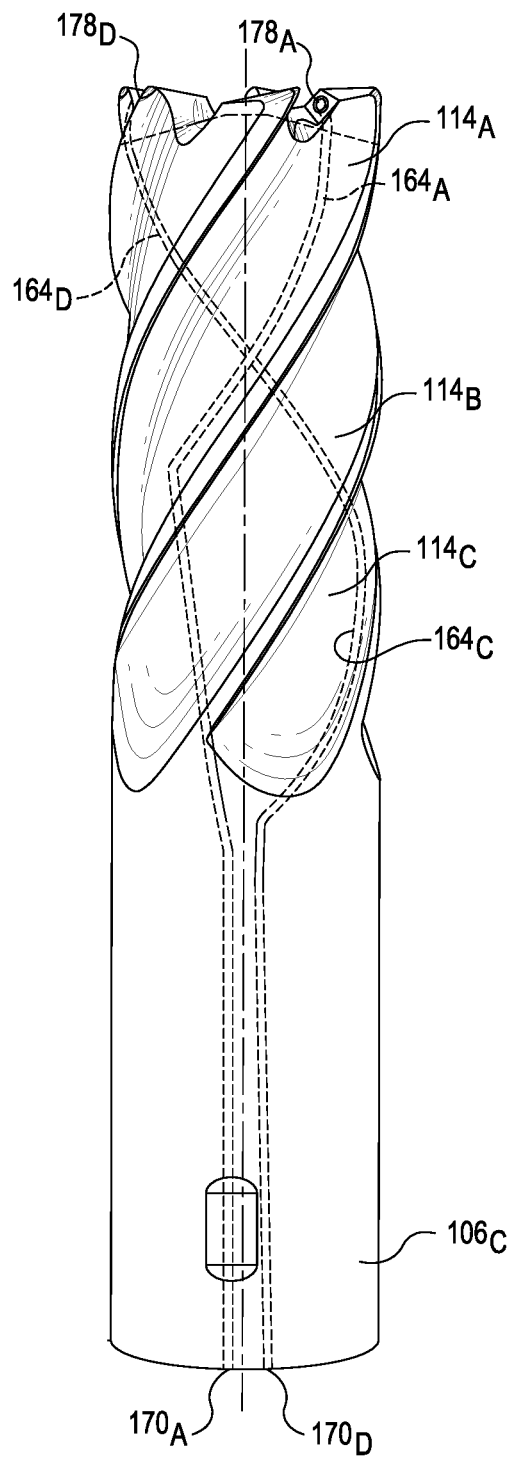
FIG. 4B provides a side elevation view of another embodiment of a rotary cutting tool, similar to that first shown in FIG. 4A above, but now showing a cutting tool which also utilizes multiple coolant passageway entry ports and multiple coolant passageways to exit ports along a plurality of flutes.

In yet another embodiment, as depicted in FIG. 4B, coolant channels may be provided with multiple entry ports 170A, 1700, etc. for use with coolant channel passageways in specific flutes $114_C$, $114_D$, etc., as suitable for a particular application, and with corresponding exit ports $178_A$, $178_D$, etc, as useful in such circumstance. Various coolant channel passageway structures may be provided via suitable techniques such as electrical discharge machining ("EDM") processes, or by drilling with diamond bit, as may be suitable in specific tool materials. In this manner, at least a portion of one or more coolant channels in the body of cutter $100_C$ are located along and within at least a portion of one or more of the flutes $114_A$, etc, as noted.

Figure 10:
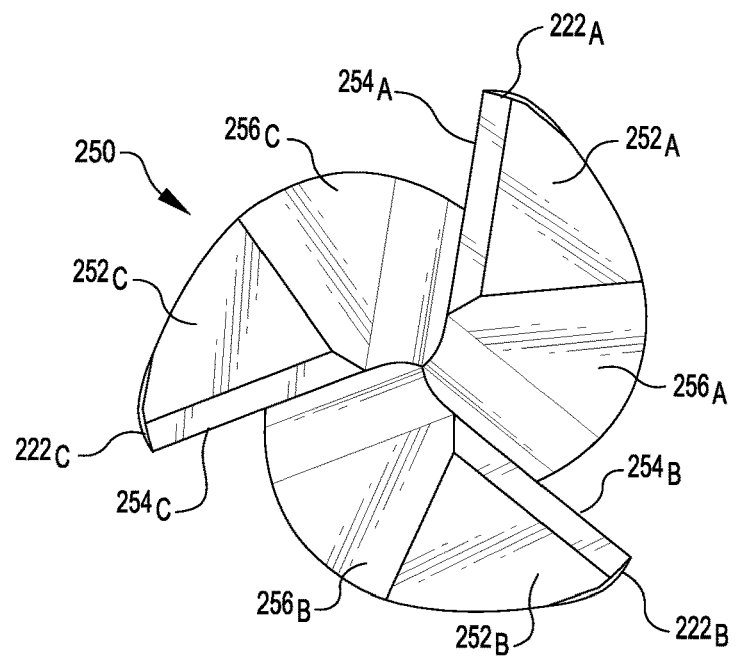
FIG. 10 is a face view of a rotary cutter similar to that just shown in FIG. 9, now showing in detail the parts of the face portion including the downwardly and inwardly sloping first dish portion adjacent each face cutting edge portion, and corner blend portions extending from flute cutting edge to the face cutting edge portions.
Figure 11:
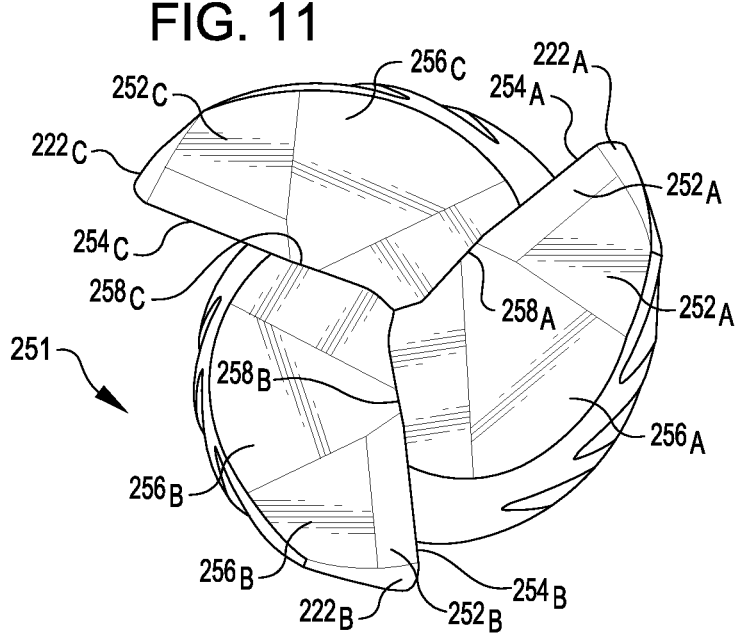
FIG. 11 is a face view of a rotary cutter similar to that just shown in FIGS. 9 and 10, but here more precisely showing in detail parts of an exemplary face portion including the downwardly and inwardly sloping first dish portion adjacent each face cutting edge portion, a downwardly and inwardly sloping second dish portion, and corner blend portions extending from flute cutting edge to the face cutting edge portions.

Attention is now directed to FIGS. 7, 9, 10, and 11, which depict a design for a three flute cutter 200 having flutes $214_A$, $214_B$, and $214_C$, with details similar to those described in detail above with respect to flutes $114_A$, $114_B$, and $114_C$ in a five flute design. FIG. 8 is a design for a similar cutter $200_G$, however, smoothly radiused gashes 202 are provided in the flutes $214_{AG}$, $214_{BG}$, and $214_{CG}$. Attention is directed to FIGS. 10 and 11, with respect to the cutting end or face portion 250 of cutter 200 depicted in FIG. 9. A first dish portion $252_A$, $252_B$, and $252_C$, (extending from each flute that runs to the face end 251 of the cutter $200_G$, respectively) slopes downwardly and inwardly (along respective first face cutting edge portions $254_A$, $254_B$, and $254_C$) at a first dish angle alpha ($\alpha$), as described above. Also, as may be appreciated from FIG. 11 in an embodiment, a second dish portion, $256_A$, $256_B$, and $256_C$, slopes downwardly and inwardly (along a respective second face cutting edge portions $258_A$, $258_B$, and $258_C$) at a second dish angle beta ($\beta$), as generally described above. Also, similar to earlier configurations described above, corner blend portions ($222_A$, $222_B$, and $222_C$) are shown extending from their respective flute cutting edge ($234_A$, and also $234_B$ and $234_C$ which are similar, but not seen in FIG. 9) and their companion first face cutting edge portions ($254_A$, $254_B$, and $254_C$). The corner blend portions $222_A$, etc. may be provided in various precise shapes as appropriate for a particular service, generally as noted above.

With respect to FIG. 12, cutter 137 provides a three flute design as having v-shaped notches 260 in flutes $264_A$, $264_B$, and $264_C$.

Figure 14:
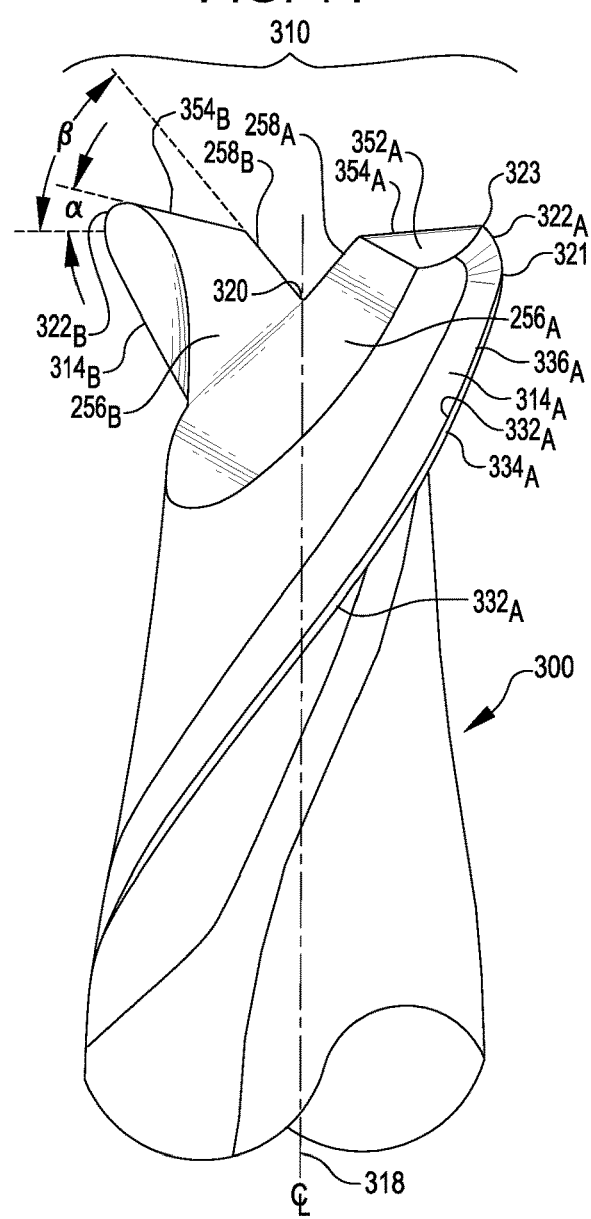
FIG. 14 is a side elevation view of yet another embodiment of a rotary cutting tool, wherein the cutting tool utilizes two flutes, and showing in detail the downwardly and inwardly sloping first dish portion adjacent each face cutting edge portion, a further downwardly and inwardly sloping second dish portion inwardly adjacent the first dish portion, as well as corner blend portions extending from flute cutting edges to face cutting edges.

Referring now to FIG. 14, a side view of a cutting end of milling cutter 300 is provided. For ease of viewing, only two opposing flutes $314_A$ and $314_B$ are shown along with the tip end 310 of milling cutter 300. The tip end 310 includes the gashed end or extension of each flute $314_A$ and $314_B$. Further, starting at the centerline 318 at the inner end 320 of cutter 300, and moving outward (to the right in FIG. 14), it can be appreciated that a point of tangency 321 occurs where the corner blend portion $322_A$ is tangent to the outer circumference of cutter 300 at leading edge land portion $332_A$ and flute cutting edge $334_A$. Reversing direction, from that circumferential point of tangency 321 and moving inwardly along corner blend portion $322_A$, a point of intersection 323 occurs where first face cutting edge portion $354_A$ of the first dished portion $352_A$ meets, and truncates, the arc of corner blend portion $322_A$. Thus, an arc that provides less than full tangency between leading edge land portion $332_A$ and the first face cutting edge portion $354_A$ of the first dished portion $352_A$ is provided. In an embodiment, a radii may be provided with respect to corner blend portion $322_A$, and such radii may complete 89 degrees or less of the arc at point of interception 323 with first end dish $352_A$.

The first dished portion $352_A$ (or $352_B$) slopes downwardly and inwardly (along respective first face cutting edge portions $354_A$ or $354_B$, at a first dish angle alpha (α), as described above. In an embodiment, the angle alpha (α), may be provided at an angle of between about 6 and about 25 degrees. In an embodiment, the angle alpha (α), may be provided at an angle of between about 6 and about 15 degrees. In yet another embodiment, angle alpha (α), may be provided at an angle of between about 8 and about 17 degrees. The corner blend portions $222_A$, etc. may be provided in various precise shapes as appropriate for a particular service, generally as noted above.

Also as may be appreciated from FIG. 14, in an embodiment, a second dish portion, $256_A$ or $256_B$, slopes downwardly and inwardly (along a respective second face cutting edge portions $258_A$ or $258_B$), at a second dish angle beta (β), as generally described above. In an embodiment, the second dish angle beta (β) may be between about 15 and about 75 degrees. In another embodiment, second dish angle beta (β), may be between about 45 degrees and 118 degrees. Adjacent to the second dish portions $256_A$ and $256_B$ is the end face gash 340. Primary end face clearance angle alpha (α), and secondary end face clearance angle beta (β) provide clearance on the end 310 of the cutting tool 300.

Use of a truncated intersection, such as a radii, at intersection 323 on the cutting tool 300 is useful and may be advantageous in various applications. However, providing a corner blend portion $322_A$ via alternate configuration, such as via one or more chamfers, or that form a conic segment or an elliptical, hyperbolic, parabolic, or other shape may be advantageous in various sizes while allowing additional strength and providing good chip flow during use of cutting tool 300 with aggressive ramping. The formed corner at 323 as described herein allows for better distribution of strain and heat generated at cutting edges, as there is more surface area and mass available for transfer of the resulting heat. The shape and thickness of a chip, and the area of a shear zone during use of the tool, including the flow path of the chip created, is thus controlled, also causing a reduction in friction and heat during use. And, strength may be provided to the tool with the addition of such non-tangential form. And, since such a corner blend configuration such as use of a truncated curve or radii, allows the chip from the tool to flow freely. Also, this configuration creates a transitional cutting face other than a sharp corner, mass and area better able to distribute heat helping to prevent plastic deformation, as compared to other designs of which we are aware. And, the cutting tool 300 itself is thus stronger, and therefore less subject to chipping.

In various embodiments, cutting tools such as cutting tool 100 or 300 may include a body made of high speed steel (as such term is used by those of skill in the art and to whom this specification is directed; see http://en.wikipedia.org/wiki/High_speed_steel, for example), or by the functional equivalents thereof. By way of example, currently available "high speed steels" include steel grades designated as M2 (a general purpose medium mechinability high speed tool steel), M3, M7 (with molybdenum, tungsten, chromium and vanadium—see the American Society for Testing Materials ASTM Specification A600, for example), and M42 (includes cobalt alloy). Also, PM materials, i.e. powdered metal or particulate materials for various tool bits, may be utilized. Another example includes Toolox44 brand machine steel manufactured by SSAB Oxelosund AB of Oxelosund, Sweden (see http://www.toolox.com). In various embodiments, cutting tools such as cutting tool 100 or 300 may have flutes or the body made of high strength steel, tungsten carbide, cermet, or ceramic materials. In an embodiment, a rotary cutter as set forth herein may have flutes made from a first flute material, and the body made from a second material. Also, in an embodiment, the flute cutting edges may be provided in a first edge material, and the body may be made of steel, including high strength steel. Also, the shank portion may be fabricated from a first shank material, and the flutes from a first flute material, and wherein the first shank material and the first flute material are securely attached with a mechanical joint therebetween. Such mechanical joint may be a threaded joint. Such mechanical joint may be a tapered joint. Further, such a mechanical joint may be a welded joint, a soldered joint, or a brazed joint. And, to provide a high quality tool, at least the cutting portion of the tool may have a surface treated using a selected tool performance enhancement process, such as (a) physical vapor deposition (PVD), (b) chemical vapor deposition (CVD), (c) flute polishing, (d) cryogenic tempering, (e) sputtering, and (f) diamond impregnation. And, various sputtering processes may be utilized, including (a) magnetron sputtering, (b) heat spike sputtering, (c) preferential sputtering, (d) electronic sputtering, and (e) physical sputtering.

Figure 15:
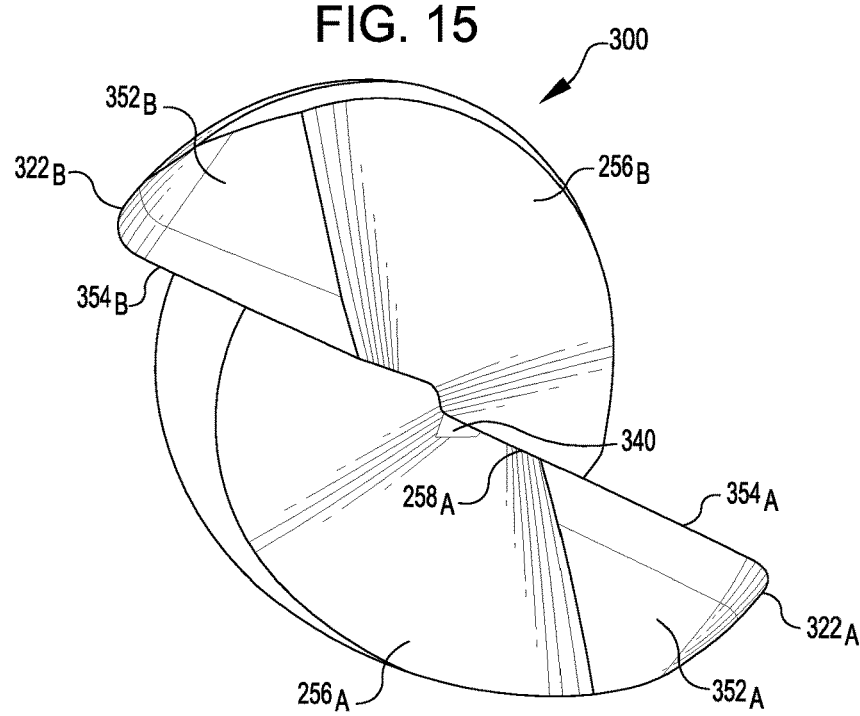
FIG. 15 provides a face end view of a rotary cutting tool just illustrated in FIG. 14 above, now showing the face portion of the cutting tool with two face cutting edge portions, and showing in detail the downwardly and inwardly sloping first dish portion adjacent each face cutting edge portion, a further downwardly and inwardly sloping second dish portion inwardly adjacent the first dish portion, as well as corner blend portions extending from each flute cutting edge portion to each face cutting edge portion.
Figure 16:
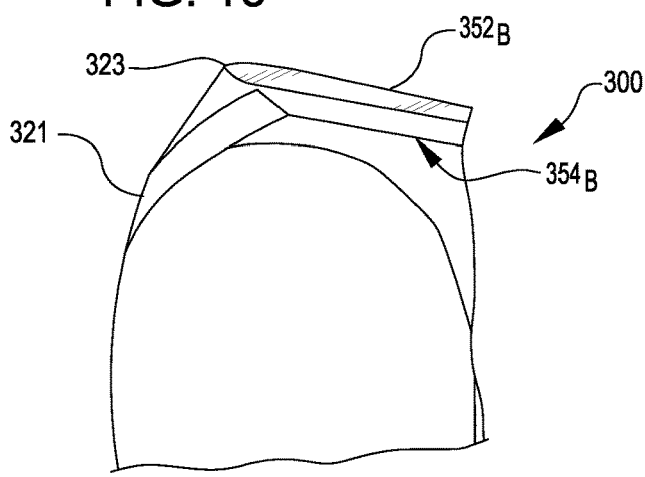
FIG. 16 provides a detailed partial side view of a portion of the rotary cutting tool just illustrated in FIGS. 14 and 15 above, showing in detail the downwardly and inwardly sloping first dish portion adjacent each face cutting edge portion, as well as corner blend portions extending from each flute cutting edge portion to each face cutting edge portion, and the face of the gullet of the flute which extends rearwardly from the face cutting edge of the positively raked flute.

As just described, and as also seen in FIGS. 15 and 16, in an embodiment, the rotary cutter or end mill 300 has an increased first dish angle alpha of from about six (6) to fifteen (15) degrees, and a second dish angle beta from about fifteen (15) to about seventy five (75) degrees, while maintaining ample strength at the end 310 of the rotary cutter or end mill 300. Such angle alpha (α) also reduces tool pressure when using the tool while ramping at an angle that is less than the first dish angle alpha (α) on the end of the cutting tool 300. When ramping at an angle less than the first dish alpha (α) on the end 310 of the cutting tool 300, the cutting tool 300 cuts only on the leading diameter of the cutting tool 300, and the first and at times the second face cutting edge portions $258_A$ or $258_B$, at a second dish angle beta (β), as generally described above, i.e. on the backside of inner cutting edges $258_A$ and $258_B$. This reduces the amount of overall cutter contact with a workpiece, as the most advantageous ramp angles are greater than five (5) degrees.

Various cutter designs as described herein, such as cutting tool 300, or cutter 100, with the extremely narrow peripheral leading edge land portion $332_A$ and accompanying first cutting edge portion $354_A$ have shown considerable improvement over prior art cutter designs, especially when tested at very high surface feet per minute. When machining at high surface footage, as mentioned above, a cutting edge preparation to provide honing of the flute and face cutting edges in the range of from about five one-hundred thousandths of an inch (0.00005 inches) to about three thousandths of an inch (0.003 inches) helps to prevent cutter chatter from to modal coupling, while showing a significant reduction in tool cutting pressures and heat generation.

Addition of coolant delivery through the body of the end mill has already been discussed in connection with FIGS. 4, 4A, and 4B above. Coolant delivery may be provided with a single hole located along the central axis of an end mill, through multiple holes parallel to the longitudinal axis, or with a spiral that matches the helix of the flutes and periphery cutting edges. Cooling exit ports may be provided as the application requires. The addition of a coolant hole or holes makes it possible to deliver coolant to the interior cutting edges at a wide range of spindle operational speeds (i.e., revolutions per minute), and even at very high spindle (rotary) speeds. The delivery of coolant through the body of the cutter to the end of the tool provides cooling to the core of the cutter body in addition to providing lubrication and coolant to the cutting face, including the first and second dish portions located at the inner tip of a tool. The supplied coolant then flows outwardly, thus cooling and lubricating the peripheral edges, i.e. the flute cutting edges. Another benefit of delivering coolant through the body of the end mill is that of chip evacuation. Chip evacuation at these high and maintainable feed rates using the rotary cutters described herein poses a challenge and is one of the largest obstacles when performing an aggressive helical ramp or pocket milling. With most if not all prior art cutters for similar work, coolant is supplied from the outside inward, often deflecting chips back in towards the pocket and cutter, causing such often work-hardened chips to be re-cut, or smashed between the outer periphery of the cutting edge and the work piece. The improvement described herein, of providing coolant through the cutter body, eliminates the problem of coolant pushing chips back in towards the cutter, as coolant flow is from the inside outward, thus carrying chips away from the cutter. This is a significant improvement in the art, and greatly reduces the incidence of re-cutting chips, especially when aggressive ramp angles are combined with helical entry. The vastly increased ramp capabilities usable when employing rotary cutters as described herein now allows one to make holes, in many cases, faster than if a drill were used to manufacture such hole in a workpiece.

Figure 20:
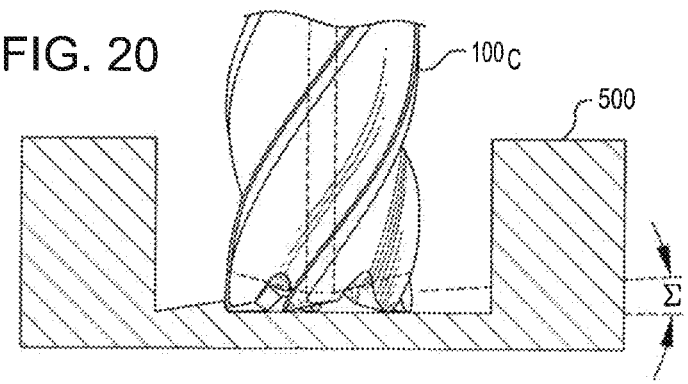
FIG. 20 provides a diagrammatic view of a workpiece being milled in accord using the novel rotary cutter set forth herein.

The rotary cutters as described herein may be advantageously employed for cutting or rough milling a workpiece 500, for example as noted in FIG. 20, where the workpiece is machined at ramp angle sigma ($\Sigma$) using a cutter $100_C$. Cutters fabricated according to the design set forth herein provide improved ramping capability as compared to prior art tools of which we are aware, especially when milling using ramping or helical plunging into solid material while making a hole or pocket. For example, when a workpiece 500 comprises steel, typical prior art rotary cutters operate at a about a two (2) degree ramp angle, at a feed rate of about fifteen (15) inches per minute (IPM), whereas a cutter such as cutter $100_C$ as described herein would operate at a ramp angle of between about eight (8) and twelve (12) degrees, at a surface feed rate of about sixty (60) inches per minute (IPM). Similarly, when a workpiece 500 comprises titanium, typical prior art rotary cutters operate at a about a one (1) degree ramp angle, at a surface feed rate of about ten (10) inches per minute (IPM), whereas a cutter such as cutter $100_C$ as described herein would operate at a ramp angle of between about three (3) and five (5) degrees, at a feed rate of about forty (40) inches per minute (IPM). Further, when a workpiece 500 comprises aluminum, typical prior art rotary cutters operate at a about a ramp angle of between six (6) and ten (10) degrees at a surface feed rate of about thirty (30) inches per minute (IPM), whereas a cutter such as cutter $100_C$ as described herein would operate at a ramp angle of between about twelve (12) and thirty five (35) degrees, at a surface feed rate of up to as much as about one hundred seventy (170) inches per minute (IPM). Generally, surface feed rates and ramp angles when milling using helical ramping with cutters as described and claimed herein are from about four (4) to about six (6) times faster than is achievable using prior art rotary cutter designs. More specifically, in an embodiment, the novel cutter designs set forth and claimed herein enable both much higher surface feed rates and the use of steeper helical ramp angles, thus making entry into a solid workpiece much easier than was heretofore the case.

Figure 19:
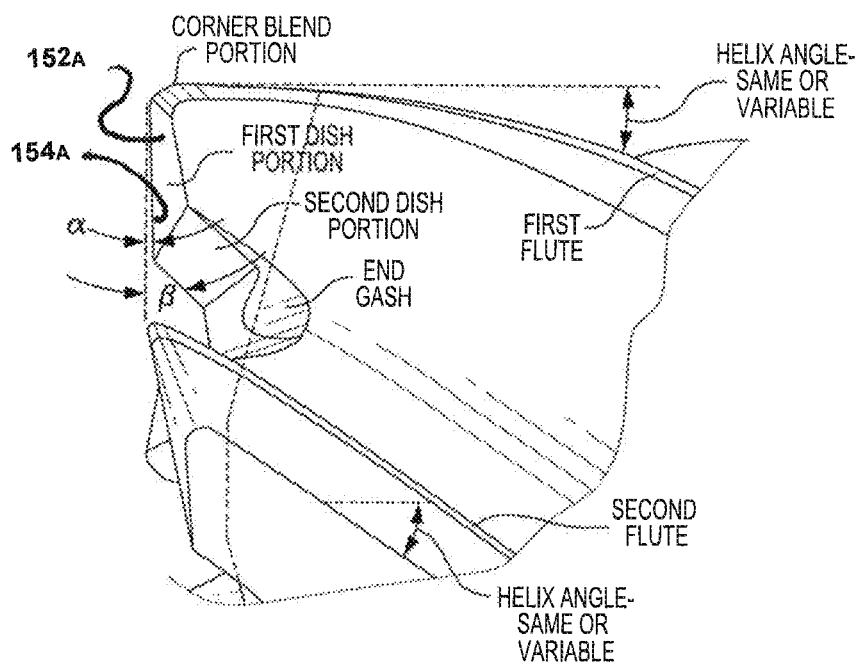
FIG. 19 provides a diagrammatic view of a rotary cutter, illustrating some optional features for spacing of helical flutes.

Further, in various embodiments, it may be advantageous to vary the type and spacing of flutes in a rotary cutter design. In an embodiment, it may be advantageous to provide straight flutes, rather than helical flutes, for example, if the rotary cutter is to be used for cutting suitable materials such as cast iron. FIG. 19 provides an overview of such options. Generally, as already illustrated, a rotary cutting tool may be provided with a plurality of helical flutes. In various embodiments, such plurality of helical flutes comprises N flutes, wherein N is a positive integer. The positive integer may be between two (2) and seven (7) for many commonly required tool sizes, but the number of flutes may be more, or less, i.e., only one (1), or eight (8), or more. In an embodiment, each of the helical flutes may have a common uniform helical angle. Alternately, only one (1), or more than one (1) of the helical flutes may have the same helical angle along its length. Further, in an embodiment, one (1) or more of the helical flutes provided may have a helical angle which varies along its length. Further, in yet another embodiment, the multiple helical flutes may have helical angles which all vary in common along their length. And, in an embodiment, a rotary cutter may be provided within a plurality of helical flutes, and wherein each of the helical flutes have a different helical angle.

Figure 17:
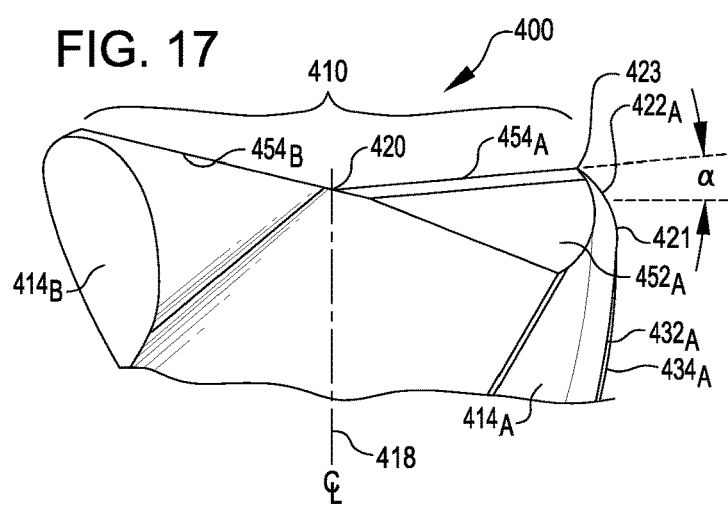
FIG. 17 provides a partial side view of a portion of yet another embodiment for a rotary cutting tool, wherein only a single or first dish portion is utilized, rather than a first and second dish portion as shown in various other embodiments, however, the downwardly and inwardly sloping first dish portion adjacent each face cutting edge portion is shown, as well as corner blend portions extending from each flute cutting edges to face cutting edges.

Turning to FIG. 17, in an embodiment, a cutter 400 may be provided where only a single dish angle alpha ($\alpha$) is utilized. In an embodiment, a single dish angle alpha ($\alpha$) of more than three (3) degrees may be utilized. Two opposing flutes 414A and 414B are shown along with the tip end 410 of milling cutter 400. Starting at the centerline 418 at the inner end 420 of cutter 400, and moving outward (to the right in FIG. 17), it can be appreciated that a point of tangency 421 occurs where the corner blend portion 422A is tangent to the outer circumference of cutter 400 at leading edge land portion 432A and flute cutting edge 434A. Reversing direction, from that circumferential point of tangency 421 and moving inwardly along corner blend portion 422A, a point of intersection 423 occurs where first cutting edge portion 454A of the first dished portion 452A meets, and truncates, the arc of corner blend portion 422A. Thus, an arc that provides less than full tangency between leading edge land portion 432A and the first cutting edge portion 454A of the first dished portion 452A is provided.

Historically, the software available for control of cutting tools in machining operations has not addressed the uniformity and precision control of radial engagement depth, or of tool engagement angle. Consequently, prior art rotary cutter tool designs have historically been provided with a core diameter in the range of from about fifty five percent (55%) to about fifty eight percent (58%) of overall tool diameter. Such designs allowed the tool to utilize deep flutes, which provided room to accommodate long chips. Such long chips might have been generated, for example, when set up with one hundred twenty (120) degree or full slotting, or when encountering a one hundred eighty (180) degree tool engagement angle such as might occur when a rotary cutter enters a corner. Such prior art tools were capable of accepting long chips and large chips, since such prior art rotary cutters were normally provided with a deep flute gullet. Wide variation in chip size is encountered in traditional tool path configurations since the tool engagement angle significantly increases when cutting into a corner of a workpiece, for example.

In an embodiment, the rotary cutters described and claimed herein have been designed for effective utilization and definition of tool geometry to enhance cutting efficiency when using advantageous rotary cutter paths through a workpiece such as are described in U.S. Pat. No. 7,577,490 B2, issued Aug. 18, 2009 to Diehl et al., entitled ENGAGEMENT MILLING, and in U.S. Pat. No. 7,451,013 B2, issued on Nov. 11, 2008 to Coleman et al., entitled ENGAGEMENT MILLING; the disclosures of each of those patents are incorporated herein in their entirety by this reference. Both of those patents are assigned to Surfware, Inc. of Westlake Village, California, who provides engagement milling software marketed under their TRUEMILL® brand, to enable users of CNC machines and the like in computer aided manufacturing (CAM) systems to improve productivity. See further details at http://www.truemill.com/content/truemill-true-engagement-milling, or contact by mail at 3200 Corte Malpaso, #104, Camarillo, California 93012. Such advantageous cutter paths assist in optimization of rotary cutter efficiency by carefully and precisely controlling the tool engagement angle, thereby providing, in an embodiment, relatively uniform radial engagement depth with respect to the workpiece, as well as relatively uniform axial depth of cut, and thus providing relatively uniform rotary cutter loading and heat dispersal. Thus, in an embodiment, such rotary cutter designs provide for relatively uniform chip length and chip thickness. In one aspect, such advantageous cutter paths enable establishment of limits on tool loading, such as radial force on a tool, and thus, tool deflection is limited. In another aspect, such advantageous cutter paths enable establishment of limits on force on flutes on the tool, which limits the tangential force on the tool, and thus, assists in providing for long tool life. In another aspect, such advantageous cutter paths enable limiting of maximum tool temperature, and in such a manner also assist in providing for long tool life. Temperature control, and maximum temperature limitations are possible because constant rotary speed can be maintained, chip thickness is limited, and the tool engagement angle is limited. In short, the amount of workpiece material that the cutting edge of the rotary cutter sweeps through is controlled and limited, and thus, the resultant heat buildup is limited. By such careful control of tool path, the cutting velocity, generally specified in terms of surface feet per minute (SFM), can be increased when using the novel rotary cutters described herein, due in part because the rotary cutter spends minimal time in limited cuts at large tool engagement angles. Thus, the material removal rates (MRR) can be increased, since larger axial depth of cuts can be provided while maintaining uniform chip size and high cutting velocities.

In an embodiment, the rotary cutters described herein may take advantage of the tool paths enabled by the techniques described by the Diehl et al. and the Coleman et al. patents just noted above, to provide improved cutting performance. In an embodiment the rotary cutters described herein may be provided with shallow gullets, yet still avoid failure due to chip packing, since when using such tool paths, the rotary cutter never exceeds a specified tool engagement angle or a specified radial depth of cut. As an example, in an embodiment, a one (1) inch diameter, five (5) flute rotary cutter may be provided for use in applications having up to a sixty (60) degree engagement angle, with a core diameter of sixty eight percent (68%) of the overall tool diameter. In an embodiment, a rotary cutter may be provided in accord with the teachings herein with a core diameter of as large as seventy five percent (75%) of the overall tool diameter.

Figure 21:
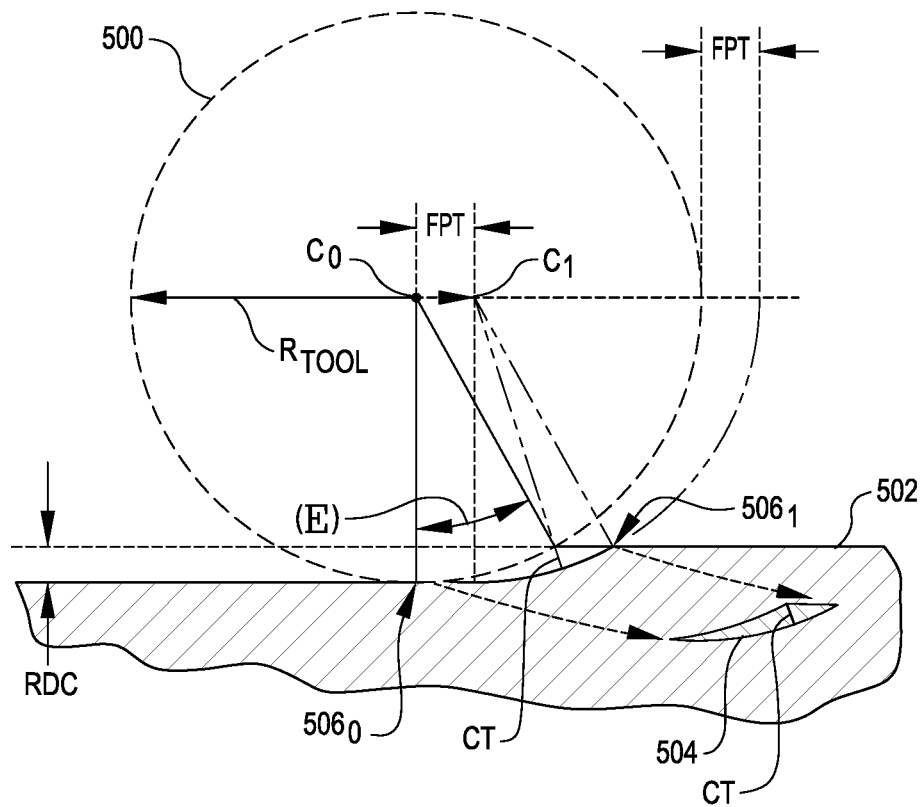
FIG. 21 provides a schematic view of a rotary cutter in use to machine a workpiece, and describes key cutting concepts, including tool feed per tooth, tool engagement angle, radial depth of cut, and chip thickness.

Attention is directed to FIG. 21, in which certain key concepts with respect to use of a rotary cutter on a workpiece are described, using a plan view, looking axially down on a rotary cutter 500 as it acts on a workpiece 502. Here, rotary cutter 500 with a tool diameter of $R_{TOOL}$ is shown acting to cut workpiece 502 to produce a chip 504. A radial depth of cut ("RDC") is indicated. Chip 504 is made by a tooth (indicated as located at point $506_O$) at the start of engagement of tooth with workpiece 502 and at point $506_1$ at the end of engagement the tooth of rotary cutter 500 with workpiece 502, as the rotary cutter 500 rotates against workpiece 502. The location of the center of rotation of rotary cuter 500 at the start of engagement of tooth with workpiece 502 is indicated as $C_O$. The location of the center of rotation of rotary cutter 500 at the end of engagement of tooth with workpiece is shown as $C_1$. The rotary cutter 500 tool engagement angle epsilon (ε) is indicated; this is the angle of rotation which is completed during engagement of a tooth with workpiece 502. Chip 504 is produced in such a cut, and an undeformed chip 504 (shown removed from the working area for purposes of explanation) has a chip thickness ("CT") equal to the sin (ε) times the feed length per tooth ("FPT"). During the cutting of a workpiece 502, an axial depth of cut ("ADC") may be selected and utilized to effectively use flute cutting edges (e.g., $134_A$ in FIG. 2) along at least some length of the cutting portion 110 of a particular rotary cutter such as cutter 101 of FIG. 2. Thus, in milling cutters or endmills as illustrated in the various figures, the material removal rate (MRR) is proportional to the axial depth of cut (ADC). When utilizing tool paths as noted above and the novel rotary cutters described herein, cuts in a workpiece 502 may be accomplished at 1.5 to 2 times the rotary cutter outside diameter OD (OD=2 times $R_{TOOL}$), or more, or in some embodiments, at about three times the outside diameter or less, for optimizing material removal rates (MRR) and the life of a rotary cutter 500. In this manner, production of uniform, but larger and fewer chips 504 result in increasing machining efficiency, as shown by lower power requirements, and less heat produced for a given material removal rate. The novel rotary cutter designs provided herein allow cutting of a chip having a chip thickness (CT) produced near, or at, the design end point for feed rate per tooth (FPT), especially when using optimized tool paths as may be employed when using the TRUEMILL brand computerized cutting parameters and machining software.

Figure 22:
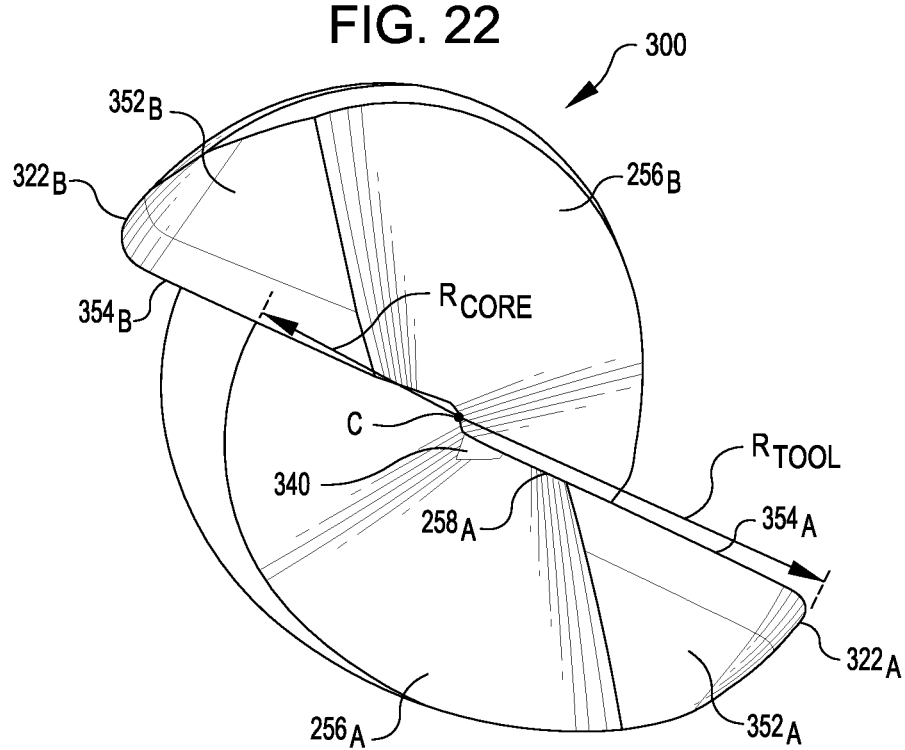
FIG. 22 provides a cross-sectional view of a rotary cutting tool, similar to the tool first illustrated in FIG. 15 above, now illustrating a two (2) flute endmill having a core diameter of at least sixty percent (60%) of the tool diameter.

In order to optimize strength of a rotary cutter or endmill as provided herein, to enable such large material removal rates, as shown in FIG. 22, in an embodiment, an endmill is provided having two flutes, wherein the core diameter CD is at least sixty percent (60%) of the outside tool diameter OD.

As illustrated, two (2) times the tool radius ($R_{TOOL}$) equals the outside diameter OD of the three flute tool 251, and two (2) times the tool core radius ($R_{CORE}$) equals the core diameter CD of the two flute endmill 300. The depth of flute is indicated as DF. The center of rotation of the various rotary cutters in this and the following figures is noted as C.

Figure 23:
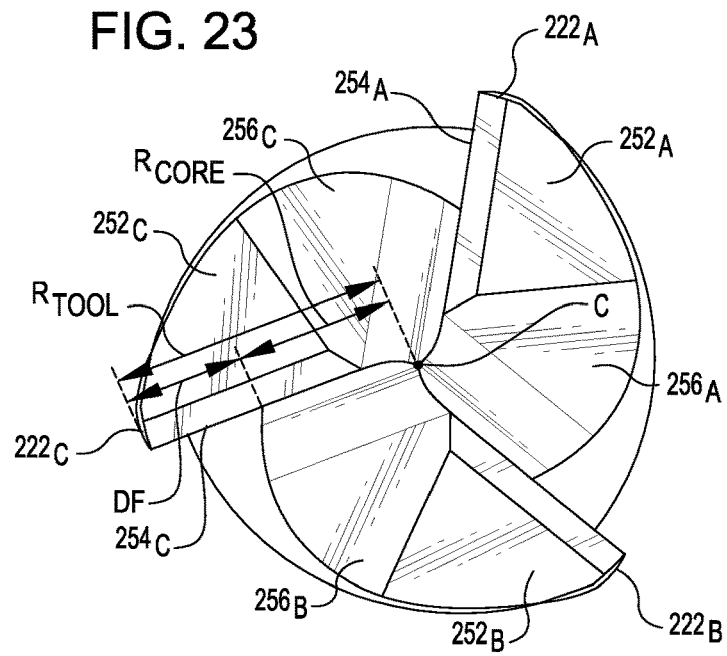
FIG. 23 provides a cross-sectional view of a rotary cutting tool, similar to the tool first illustrated in FIG. 10 above, now illustrating a three (3) flute endmill having a core diameter of at least sixty percent (60%) of the tool diameter.

In order to optimize strength of a rotary cutter or endmill as provided herein, to enable such large material removal rates, as shown in FIG. 23, in an embodiment, an endmill 530 is provided having three flutes, wherein the core diameter CD is at least sixty percent (60%) of the outside tool diameter OD. As illustrated, two (2) times the tool radius ($R_{TOOL}$) equals the outside diameter OD of the three flute endmill 530, and two (2) times the tool core radius ($R_{CORE}$) equals the core diameter CD of the three flute endmill 530.

Figure 24:
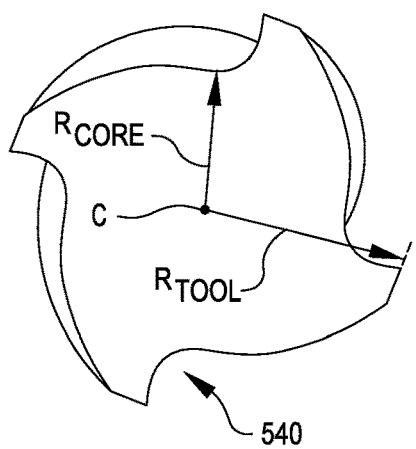
FIG. 24 provides a cross-sectional view of a rotary cutting tool, illustrating a four (4) flute endmill having a core diameter of at least sixty percent (60%) of the tool diameter, and more particularly in this illustration, having a core diameter of slightly more than sixty eight percent (68%) of the tool diameter.

In order to optimize strength of a rotary cutter or endmill as provided herein, to enable such large material removal rates, as shown in FIG. 24, in an embodiment, an endmill 540 is provided having four flutes, wherein the core diameter CD is at least fifty eight percent (58%) of the outside tool diameter OD. As illustrated, two (2) times the tool radius ($R_{TOOL}$) equals the outside diameter OD of the four flute endmill 540, and two (2) times the tool core radius ($R_{CORE}$) equals the core diameter CD of the four flute endmill 540. As illustrated, the four flute endmill 540 has a core diameter CD of at least sixty percent (60%) of the outside diameter OD of four flute endmill 540.

Figure 25:
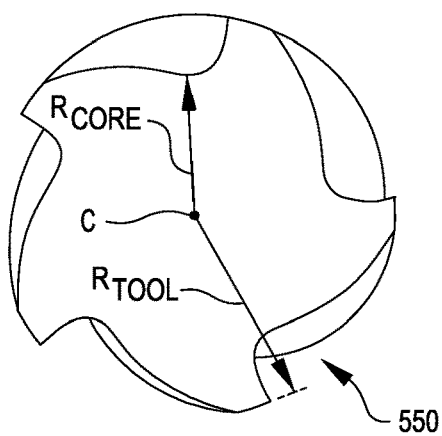
FIG. 25 provides a cross-sectional view of a rotary cutting tool, illustrating a five (5) flute endmill having a core diameter of at least sixty one percent (61%) of the tool diameter, and more particularly in this illustration, having a core diameter of at least sixty four percent (64%) of the tool diameter.

In order to optimize strength of a rotary cutter or endmill as provided herein, to enable such large material removal rates, as shown in FIG. 25, in an embodiment, an endmill 550 is provided having five flutes, and wherein the core diameter CD is at least sixty one percent (61%) of the outside tool diameter OD. As illustrated, two (2) times the tool radius ($R_{TOOL}$) equals the outside diameter OD of the five flute endmill 550, and two (2) times the tool core radius ($R_{CORE}$) equals the core diameter CD of the five flute endmill 550. As illustrated, the five flute endmill 550 has a core diameter CD of at least sixty four percent (64%) of the outside diameter OD of five flute endmill 550.

Figure 26:
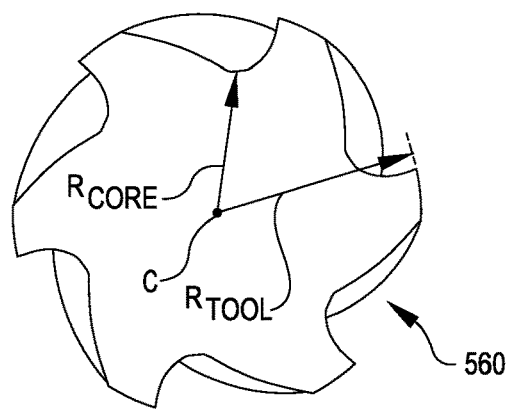
FIG. 26 provides a cross-sectional view of a rotary cutting tool, illustrating a six (6) flute endmill having a core diameter of at least sixty three percent (63%) of the tool diameter, and more particularly in this illustration, having a core diameter of at least sixty five percent (65%) of the tool diameter.

In order to optimize strength of a rotary cutter or endmill as provided herein, to enable such large material removal rates, as shown in FIG. 26, in an embodiment, an endmill 560 is provided having six flutes, and wherein the core diameter CD is at least sixty three percent (63%) of the outside tool diameter OD. More preferably, the core diameter of six flute endmill 560 is at least sixty five percent (65%) of the outside tool diameter OD. Even more preferably, the core diameter of six flute endmill 560 is at least sixty five percent (65%) of the outside tool diameter OD. As illustrated, two (2) times the tool radius ($R_{TOOL}$) equals the outside diameter OD of the six flute endmill 560, and two (2) times the tool core radius ($R_{CORE}$) equals the core diameter CD of the six flute endmill 560.

Figure 27:
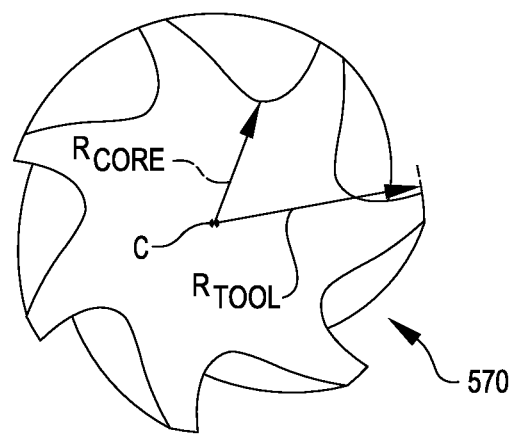
FIG. 27 provides a cross-sectional view of a rotary cutting tool, illustrating a seven (7) flute endmill having a core diameter of at least sixty four percent (64%) of the tool diameter.

In order to optimize strength of a rotary cutter or endmill as provided herein, to enable such large material removal rates, as shown in FIG. 27, in an embodiment, an endmill 570 is provided having seven flutes, and wherein the core diameter CD is at least sixty-four percent (64%) of the outside tool diameter OD. More preferably, the core diameter of seven flute endmill 570 is at least sixty eight percent (68%) of the outside tool diameter OD. As illustrated, two (2) times the tool radius ($R_{TOOL}$) equals the outside diameter OD of the seven flute endmill 570, and two (2) times the tool core radius ($R_{CORE}$) equals the core diameter CD of the seven flute endmill 570.

Figure 28:
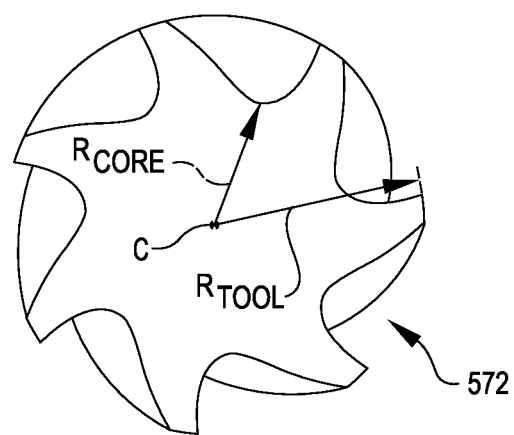
FIG. 28 shows a cross-sectional view of a rotary cutting tool, illustrating a seven (7) flute endmill having a core diameter of at least sixty four percent (64%), and more particularly in this illustration, having a core diameter of at least sixty eight percent (68%) of the tool diameter.

In order to optimize strength of a rotary cutter or endmill as provided herein, to enable such large material removal rates, as shown in FIG. 28, in an embodiment, an endmill 572 is provided having seven flutes, and wherein the core diameter CD is at least sixty seven percent (67%) of the outside tool diameter. More preferably, the core diameter of seven flute endmill 572 is at least sixty eight percent (68%) of the outside tool diameter OD. As illustrated, two (2) times the tool radius ($R_{TOOL}$) equals the outside diameter OD of the seven flute endmill 572, and two (2) times the tool core radius ($R_{CORE}$) equals the core diameter CD of the seven flute endmill 572. As illustrated in FIG. 28, the seven flute endmill 572 has a core diameter CD of sixty eight point one four percent (68.14%) of the outside diameter OD of seven flute endmill 572.

Various embodiments for an endmill as just set forth above may be utilized in a method of removing material from a workpiece using a rotary cutter. In such a method a rotary cutter is provided. The rotary cutter or endmill will have a selected outside diameter and a selected core diameter, and the selected core diameter will be greater than sixty percent of the selected outside diameter. The workpiece may be milled using a selected ramp angle broadly in the range of from about five degrees to about thirty five degrees. The rotary cutter may be used with an axial depth of cut of from about one point five to about three times the outside diameter of the rotary cutter. The number of flutes and corresponding core diameters may be selected for a particular cutter as just set forth above.

By providing large core diameters, as just described, the strength of the rotary cutter is greatly increased, thus allowing far larger loads than could be supported by prior art milling rotary cutters of which we are aware. Such increased loading is created by increased axial depth of cut and by increased chip thickness. Also, providing a larger core diameter as taught herein increases the rigidity of a rotary cutter, thus reducing the effect of modal coupling, and as a consequence, significant increases in cutter speed and feed rate are possible, without chatter. Note that the core diameters as set forth in the preceding paragraphs are applicable to the novel rotary cutters disclosed herein in various embodiments wherein the rotary cutters have an outside tool diameter and a core diameter and wherein such rotary cutters have a usable cutting portion $A_L$ (see FIG. 2) having a length of less than or equal to about three times said outside tool diameter OD, to thereby enable an axial depth of cut (ADC) on a workpiece as deep as the length $A_L$ of the usable cutting portion of the rotary cutter.

When prior art endmills with conventional flute depth and/or core diameter are run at the rotary speeds and workpiece feed rates as are possible to routinely achieve using the novel rotary cutter described herein, the result is often the catastrophic failure of such prior art tools, since such prior art tools do not have sufficient strength, in cross-section, due to smaller core diameters, in order to withstand stress from greatly increased cutting forces.

In the foregoing description, for purposes of explanation, numerous details have been set forth in order to provide a thorough understanding of the disclosed exemplary embodiments for the design of a novel rotary cutting tool. However, certain of the described details may not be required in order to provide useful embodiments, or to practice a selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in a method described herein may have been described as multiple discrete activities, in turn, in a manner that is most helpful in understanding the present invention. However, the order of description should not be construed as to imply that such activities are necessarily order dependent. In particular, certain operations may not necessarily need to be performed in the order of presentation. And, in different embodiments of the invention, one or more design or assembly activities may be performed simultaneously, or eliminated in part or in whole while other design or assembly activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

Further, it should be understood by those of skill in the art and to whom this specification is directed that the term "conic" refers to the intersection of a plane and a conical surface, which may result in an elliptical shape, a parabolic shape, or a hyperbolic shape. Further, in the case where the axes of the elliptical shape are equal, a circle results, and thus a constant radius curve would be described.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures. Numerous modifications and variations are possible in light of the above teachings. Therefore, the protection afforded to this invention should be limited only by the claims set forth herein, and the legal equivalents thereof.

The invention claimed is:

1. An endmill, the endmill having an outside tool diameter, a core diameter, and an end face portion, wherein the endmill comprises flute cutting edge portions and face cutting edge portions, and wherein the endmill further comprises corner blend portions extending from flute cutting edge portions to first face cutting edge portions, wherein the first face cutting edge portions simultaneously slope both inwardly in a direction from corner blend portions towards a longitudinal axis of the endmill and downwardly, in a direction towards a shank portion, from the corner blend portions towards the longitudinal axis of the endmill at a first dish angle alpha ($\alpha$) in a range of from about five point five (5.5) degrees to about twenty five (25) degrees, and wherein second face cutting edge portions simultaneously slope both inwardly in a direction from said first face cutting edge portions towards the longitudinal axis of the endmill and downwardly, in a direction towards the shank portion, from the first face cutting edge portions towards the longitudinal axis of the endmill at a second dish angle beta ($\beta$), and wherein the endmill further comprises one or more coolant passageways therethrough, and wherein at least one of the one or more coolant passageways exits at an exit port located on the end face portion, and wherein an exit port is located at a center of rotation of the end face portion.

2. The endmill as set forth in claim 1, wherein the endmill comprises one or more gash portions, and wherein at least one of the one or more coolant passageways therethrough comprises an exit port located on a gash portion of the one or more gash portions.

3. The endmill as set forth in claim 1, wherein the endmill comprises one or more dish portions, and wherein at least one of the one or more coolant passageways therethrough comprises an exit port located on a dish portion of the one or more dish portions.

4. The endmill as set forth in claim 3, wherein the dish portion comprises a first dish portion.

5. The endmill as set forth in claim 4, wherein the dish portion comprises a second dish portion.

6. The endmill as set forth in claim 1, wherein the first face cutting edge portions slope inwardly and downwardly at the first dish angle alpha ($\alpha$) in a range of from about six (6) degrees to about fifteen (15) degrees.

7. The endmill as set forth in claim 1, wherein the endmill has three flutes.

8. The endmill as set forth in claim 1, wherein the endmill has four flutes.

9. The endmill as set forth in claim 1, wherein the endmill has five flutes, and wherein the core diameter is at least sixty one percent (61%) of the outside tool diameter.

10. The endmill as set forth in claim 9, wherein the core diameter is at least sixty four percent (64%) of the outside tool diameter.

11. The endmill as set forth in claim 1, wherein the endmill has six flutes, and wherein the core diameter is at least sixty three percent (63%) of the outside tool diameter.

12. The endmill as set forth in claim 11, wherein the core diameter is at least sixty five percent (65%) of the outside tool diameter.

13. The endmill as set forth in claim 1, wherein the endmill has seven flutes, and wherein the core diameter is at least sixty four percent (64%) of the outside tool diameter.

14. The endmill as set forth in claim 1, wherein the endmill has a usable cutting portion with a length of less than or equal to three times the outside tool diameter, to thereby enable an axial depth of cut on a workpiece as deep as the length of the usable cutting portion.

15. The endmill as set forth in claim 1, wherein the endmill comprises one or more end face clearance portions, and wherein at least one of the one or more coolant passageways therethrough comprises an exit port located on an end face clearance portion of the one or more end face clearance portions.

16. The endmill as set forth in claim 15, wherein the end face clearance portion of the one or more end face clearance portions comprises a primary end face clearance portion.

17. The endmill as set forth in claim 15, wherein the end face clearance portion of the one or more end face clearance portions comprises a secondary end face clearance portion.

18. The endmill as set forth in claim 1, wherein the second face cutting edge portions slope inwardly and downwardly at the second dish angle beta ($\beta$) in a range of from about fifteen (15) degrees to about seventy five (75) degrees.

19. The endmill as set forth in claim 1, wherein the second face cutting edge portions slope inwardly and downwardly at the second dish angle beta ($\beta$) in a range of from about twenty five (25) degrees to about seventy (70) degrees.

20. The endmill as set forth in claim 1, wherein the second face cutting edge portions slope inwardly and downwardly at the second dish angle beta ($\beta$) in a range of from about forty five (45) degrees to about one hundred eighteen (118) degrees.

* * * * *